(12) United States Patent
Atarashi et al.

(10) Patent No.: US 9,050,971 B2
(45) Date of Patent: Jun. 9, 2015

(54) VEHICLE DRIVE DEVICE

(75) Inventors: Tomoo Atarashi, Kariya (JP); Shigeki Takami, Anjo (JP); Takafumi Koshida, Anjo (JP); Hidetoshi Aoki, Anjo (JP); Yoshihisa Yamamoto, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/006,241

(22) PCT Filed: May 30, 2012

(86) PCT No.: PCT/JP2012/063962
§ 371 (c)(1),
(2), (4) Date: Sep. 19, 2013

(87) PCT Pub. No.: WO2012/169410
PCT Pub. Date: Dec. 13, 2012

(65) Prior Publication Data
US 2014/0011618 A1    Jan. 9, 2014

(30) Foreign Application Priority Data
Jun. 7, 2011 (JP) .................... 2011-127214

(51) Int. Cl.
*B60K 6/365* (2007.10)
*B60K 6/387* (2007.10)
(Continued)

(52) U.S. Cl.
CPC *B60W 20/10* (2013.01); *B60K 6/40* (2013.01); *B60K 6/365* (2013.01); *B60K 6/547* (2013.01); *B60K 6/387* (2013.01); *B60K 6/445* (2013.01);
(Continued)

(58) Field of Classification Search
CPC .......... B60K 6/365; B60K 6/387; B60K 6/40; B60K 6/44; B60K 6/547

USPC ....................................... 475/4, 5; 180/65.235
See application file for complete search history.

(56) References Cited

U.S. PATENT DOCUMENTS

| 5,788,006 A | 8/1998 | Yamaguchi | |
| 6,155,364 A * | 12/2000 | Nagano et al. | 180/65.235 |

(Continued)

FOREIGN PATENT DOCUMENTS

| JP | A-63-1840 | 1/1988 |
| JP | A-6-300052 | 10/1994 |

(Continued)

OTHER PUBLICATIONS

International Search Report issued in International Application No. PCT/JP2012/063962 dated Jul. 10, 2012.

*Primary Examiner* — Tisha Lewis
(74) *Attorney, Agent, or Firm* — Oliff PLC

(57) ABSTRACT

A vehicle drive device having an input member coupled to an internal combustion engine; an output member coupled to a wheel; a first rotating electrical machine; a second rotating electrical machine; and a differential gear unit having at least three rotating elements. A dog engagement device is provided on a power transmission path between the input member and an input rotating element. The engagement device includes a state selecting member that switches a state among three states, which are a first state where the input rotating element and the input member are coupled and the input rotating element and a non-rotating member are not coupled, a second state where the input rotating element coupled with both the input member and the non-rotating member, and a third state where the input rotating element and the non-rotating member are coupled.

14 Claims, 13 Drawing Sheets

(51) Int. Cl.
    *B60K 6/40*    (2007.10)
    *B60K 6/445*    (2007.10)
    *B60K 6/547*    (2007.10)
    *B60W 20/00*    (2006.01)
    *B60K 6/38*    (2007.10)
    *F16H 37/08*    (2006.01)
    *F16H 3/72*    (2006.01)

(52) U.S. Cl.
    CPC ..... *B60K 2006/381* (2013.01); *B60Y 2400/421* (2013.01); *F16H 2037/0866* (2013.01); *F16H 2200/2005* (2013.01); *Y02T 10/6239* (2013.01); *Y10S 903/902* (2013.01); *F16H 3/728* (2013.01); *F16H 2037/0873* (2013.01); *F16H 2200/2064* (2013.01)

(56) References Cited

U.S. PATENT DOCUMENTS

| | | | |
|---|---|---|---|
| 7,806,795 B2 | 10/2010 | Oba et al. | |
| 8,056,659 B2 | 11/2011 | Oba et al. | |
| 8,257,214 B2 * | 9/2012 | Knoblauch | 475/5 |
| 8,424,622 B2 * | 4/2013 | Ideshio et al. | 180/65.225 |
| 8,469,859 B2 * | 6/2013 | Kimura et al. | 477/5 |
| 2010/0018789 A1 | 1/2010 | Oba et al. | |
| 2010/0051360 A1 | 3/2010 | Oba et al. | |

FOREIGN PATENT DOCUMENTS

| | | |
|---|---|---|
| JP | A-08-295140 | 11/1996 |
| JP | 2005-192284 A | 7/2005 |
| JP | A-2006-17226 | 1/2006 |
| JP | A-2008-120233 | 5/2008 |
| JP | A-2008-179352 | 8/2008 |
| JP | A-2009-1180 | 1/2009 |
| JP | A-2010-036880 | 2/2010 |
| JP | 2010-083351 A | 4/2010 |
| JP | A-2010-143282 | 7/2010 |
| JP | 2012-111433 A | 6/2012 |
| WO | WO 2008/050684 A1 | 5/2008 |
| WO | WO 2008/062659 A1 | 5/2008 |
| WO | WO 2008/062717 A1 | 5/2008 |

* cited by examiner

VEHICLE DRIVE DEVICE

INCORPORATION BY REFERENCE

The disclosure of Japanese Patent Application No. 2011-127214 filed on Jun. 7, 2011 including the specification, drawings and abstract is incorporated herein by reference in its entirety.

BACKGROUND OF THE INVENTION

The present invention relates to vehicle drive devices including an input member that is drivingly coupled to an internal combustion engine, an output member that is drivingly coupled to wheels, a first rotating electrical machine, a second rotating electrical machine, and a differential gear unit having at least three rotating elements.

DESCRIPTION OF THE RELATED ART

Related art of such vehicle drive devices includes a technique described in, e.g., the following Japanese Patent Application Publication No. H08-295140 (JP H08-295140 A) (paragraphs [0038], [0039], FIG. 8, etc.). In the description of the section "Description of the Related Art," the reference characters or names in JP H08-295140 A are shown in parentheses as appropriate. FIG. 8 of JP H08-295140 A shows a configuration in which a differential gear unit is formed by a planetary gear mechanism having three rotating elements (planetary gear unit 13), and a first rotating electrical machine (generator motor 16), an input member, and a second rotating electrical machine (electric motor 25) and an output member are drivingly coupled to the different rotating elements of the differential gear unit, respectively. This vehicle drive device includes a first engagement device (one-way clutch F) that restricts rotation (negative rotation in the example of FIG. 8) of an input rotating element (carrier CR) as the rotating element of the differential gear unit to which the input member is drivingly coupled. Thus, the input rotating element with its rotation being restricted can receive a reaction force of the torque of the first rotating electrical machine to transfer the torque of the first rotating electrical machine to the output member, and the torque of the second rotating electrical machine can be supplemented with the torque of the first rotating electrical machine to move a vehicle.

The vehicle drive device shown in FIG. 8 of JP H08-295140 A further includes a second engagement device (clutch C) capable of releasing the driving coupling between the input member and the input rotating element, in addition to the first engagement device. Accordingly, as described in paragraph [0039] of this document, the input member can be separated from the input rotating element when the torque of the second rotating electrical machine is supplemented with the torque of the first rotating electrical machine to move the vehicle. Such a traveling state can thus be implemented without stopping an internal combustion engine (internal combustion engine 11).

However, in the configuration of JP H08-295140 A, the first engagement device (one-way clutch F) and the second engagement device (clutch C) as separate parts need be provided in order to implement both restriction of rotation of the input rotating element and separation of the input member from the input rotating element. Accordingly, in the configuration of JP H08-295140 A, the number of parts in the overall device is increased by the number of parts of the first engagement device and the number of parts of the second engagement device. Moreover, spaces are required to place the separately provided first and second engagement devices therein, which may increase the device size.

SUMMARY OF THE INVENTION

It is therefore desired to implement a vehicle drive device capable of reducing the number of parts and the device size.

According to an aspect of the present invention, a vehicle drive device includes: an input member that is drivingly coupled to an internal combustion engine; an output member that is drivingly coupled to a wheel; a first rotating electrical machine; a second rotating electrical machine; and a differential gear unit having at least three rotating elements. In the vehicle drive device, the first rotating electrical machine, the input member, and the output member are drivingly coupled to the different rotating elements of the differential gear unit, respectively, without interposing the other rotating elements of the differential gear unit therebetween, the second rotating electrical machine is drivingly coupled to the rotating element of the differential gear unit other than the rotating element to which the first rotating electrical machine is drivingly coupled, without interposing the other rotating elements of the differential gear unit therebetween, a dog engagement device is provided on a power transmission path between the input member and an input rotating element as the rotating element of the differential gear unit to which the input member is drivingly coupled, and the engagement device includes a state selecting member that switches a state among three states, which are a first state where the input rotating element and the input member are brought into a coupled state and the input rotating element and a non-rotating member are brought into a non-coupled state, a second state where the input rotating element is brought into the non-coupled state with both the input member and the non-rotating member, and a third state where the input rotating element and the non-rotating member are brought into the coupled state.

In the present application, the expression "drivingly coupled" refers to the state where two rotating elements are coupled together so that a driving force can be transmitted therebetween, and is used as a concept including the state where the two rotating elements are coupled together so as to rotate together, or the state where the two rotating elements are coupled together so that the driving force can be transmitted therebetween via one or more transmission members. Such transmission members include various members that transmit rotation at the same speed or at a changed speed, and include, e.g., a shaft, a gear mechanism, a belt, a chain. Such transmission members may include an engagement device that selectively transmits rotation and a driving force, such as a friction engagement device, a dog engagement device. Note that the term "driving force" is herein used as a synonym for "torque."

In the present application, a differential gear mechanism including three rotating elements, such as a planetary gear mechanism including a sun gear, a carrier, and a ring gear, is used, and this differential gear mechanism itself or a device obtained by combining a plurality of differential gear mechanisms is referred to as the differential gear unit.

In the present application, the "rotating electrical machine" is used as a concept including a motor (electric motor), a generator (electric generator), and a motor-generator that functions both as the motor and the generator as necessary.

In the present application, the expression "coupled state" refers to the state where two rotating elements that are drivingly coupled via an engagement device are kept coupled, and the expression "non-coupled state" refers to the state where two rotating elements that are drivingly coupled via an engagement device are decoupled. That is, the "coupled state" is the state where a driving force is transmitted between two rotating elements that are drivingly coupled via an engagement member, and there is a correlation between the rotating state of one of the rotating elements and the rotating state of the other rotating element. The "non-coupled state" is the state where no driving force is transmitted between two rotating elements that are drivingly coupled via an engagement device, and there is no correlation between the rotating state of one of the rotating elements and the rotating state of the other rotating element. The "rotating state" refers to the physical quantity regarding rotational motion, and means, e.g., the rotational position (rotational angle), the rotational speed, or the rotational acceleration.

According to the aspect, the first state where the input rotating element and the input member coordinate to rotate, the second state where the input member is separated from the input rotating element so that the input rotating element is rotatable independently of the input member, and the third state where rotation of the input rotating element is restricted can be implemented by switching the engagement device as a common device. Thus, the number of parts in the overall device and the device size can be reduced by using a common component to implement each state, etc., as compared to the case where separate engagement devices are provided to implement the second state and the third state.

The state selecting member may be placed between the internal combustion engine and the differential gear unit in an axial direction of the differential gear unit so as to be movable along the axial direction, and be capable of selecting a first position implementing the first state, a second position implementing the second state, and a third position implementing the third state, and the first position be located on an internal combustion engine side in the axial direction with respect to the third position.

According to this configuration, the state of the engaging device can be switched among the first state, the second state, and the third state by switching the axial position of the state selecting member. This can simplify the configuration of the engagement device, and can reduce the number of parts and the device size. Moreover, according to the above configuration, the first position is located on the internal combustion engine side in the axial direction with respect to the third position. This allows the configuration implementing the third state at the third position not to be placed on the internal combustion engine side in the axial direction with respect to the first position, and facilitates simplification of the configuration that couples the input rotating element to the input member at the first position. As a result, the configuration of the engagement device can be simplified.

The engagement device may further include an input member engagement portion provided on the input member, an input rotating element engagement portion provided on the input rotating element, and a non-rotating member engagement portion provided on the non-rotating member, the state selecting member be configured to selectively mesh with the input member engagement portion, the input rotating element engagement portion, and the non-rotating member engagement portion, the input member engagement portion be an externally-toothed engagement portion, the input rotating element engagement portion be an externally-toothed engagement portion placed on an axial first direction side, which is an opposite side from the internal combustion engine in the axial direction of the differential gear unit, with respect to the input member engagement portion, and the non-rotating member engagement portion be an externally-toothed engagement portion placed on the axial first direction side with respect to the input rotating element engagement portion, or the non-rotating member engagement portion be an internally-toothed engagement portion placed either at such a position that the non-rotating member engagement portion has a portion overlapping the input rotating element engagement portion as viewed in a radial direction of the differential gear unit, or on the axial first direction side with respect to the position.

In the present application, regarding arrangement of two members, the expression "having an overlapping portion" as viewed in a predetermined direction means that when the predetermined direction is assumed as a direction of line of sight, and a viewing point is moved in each direction perpendicular to the direction of line of sight, at least some area includes the viewing point from which the two members are seen to overlap each other.

According to this configuration, the dimensions of the engagement device are reduced, and the overall device size can be reduced. That is, in the configuration in which the non-rotating member engagement portion is an externally-toothed engagement portion placed on the axial first direction side with respect to the input rotating element engagement portion, the input member engagement portion, the input rotating element engagement portion, and the non-rotating member engagement portion are placed at differential axial positions, and all of the engagement portions are externally-toothed engagement portions. This can facilitate reduction in radial range that is occupied by the engagement device, whereby the overall device size in the radial direction can be reduced. In the configuration in which the non-rotating member engagement portion is an internally-toothed engagement portion placed either at such a position that the non-rotating member engagement portion has a portion overlapping the input rotating element engagement portion as viewed in the radial direction of the differential gear unit, or on the axial first direction side with respect to the position, reduction in axial range that is occupied by the engagement device is facilitated, whereby the overall device size in the axial direction can be reduced.

A flywheel may be provided in a coupling portion of the input member with the input rotating element, a damper may be provided in a coupling portion of the input rotating element with the input member, the input member engagement portion of the engagement member, which is provided on the input member, may be formed on an outer peripheral surface of the flywheel, the input rotating element engagement portion of the engagement member, which is provided on the input rotating element, may be formed on an outer peripheral surface of the damper, and the non-rotating member engagement portion of the engagement member, which is provided on the non-rotating member, may be formed on an inner peripheral surface of a case accommodating at least the flywheel and the damper.

According to this configuration, in the case where the vehicle drive device includes a flywheel and a damper, the engagement device can be provided while an increase in the number of parts is suppressed by effectively using these existing parts.

In the configuration in which the state selecting member is placed so as to be movable along the axial direction of the differential gear unit, and is capable of selecting the first position, the second position, and the third position as described above, the second position and the third position may be located so as to adjoin each other along the axial direction.

According to this configuration, the state can be switched between the second and third states without going through the first state, whereby the switching between the second and third states can be more quickly performed.

In the vehicle drive device having each of the above configurations, an order of rotational speeds of the at least three rotating elements of the differential gear unit may be the rotating element to which the first rotating electrical machine is drivingly coupled, the input rotating element, and the rotating element to which the output member is drivingly coupled, and the second rotating electrical machine may be drivingly coupled to the rotating element of the differential gear unit other than the rotating element to which the first rotating electrical machine is drivingly coupled and the input rotating element, without interposing the other rotating elements of the differential gear unit therebetween.

Note that the "order of the rotational speeds" refers to either the order from a higher speed to a lower speed or the order from a lower speed to a higher speed. Although either one of the orders is possible depending on the rotating state of each differential gear mechanism, the order of the rotating elements is the same in either case.

According to this configuration, by bringing the engagement device into the first state, a split drive mode can be implemented in which a vehicle is driven via the output member and the wheels while the first rotating electrical machine is caused to generate electricity by using the driving force of the internal combustion engine that is drivingly coupled to the input member.

The vehicle drive device having each of the above configurations may further include: a control portion that controls operation of the state selecting member, the state selecting member may be placed between the internal combustion engine and the differential gear unit in the axial direction of the differential gear unit so as to be movable along the axial direction, and be capable of selecting the first position implementing the first state, the second position implementing the second state, and the third position implementing the third state, and the control portion may control the state electing member so that, in specific mode transition between two drive modes that are implemented at two end positions located on both sides in the axial direction out of the first position, the second position, and the third position located along the axial direction, the state selecting member is continuously shifted from one of the two end positions to the other with rotational speeds of both the input rotating element and the input member being zero.

According to this configuration, since the state of the engagement device can be switched among the first, second, and third states by switching the axial position of the state selecting member, the configuration of the engagement device can be simplified, and the number of parts and the device size can be reduced. Moreover, according to the configuration, the specific mode transition can be smoothly made in the state where the rotational speeds of both the input rotating element and the input member are zero and the input rotating element, the input member, and the non-rotating member are synchronized. In this case, the specific mode transition can be more quickly made by continuously shifting the state selecting member from one of the two end positions to the other.

DETAILED DESCRIPTION OF THE EMBODIMENTS

1. First Embodiment

Figure 1:
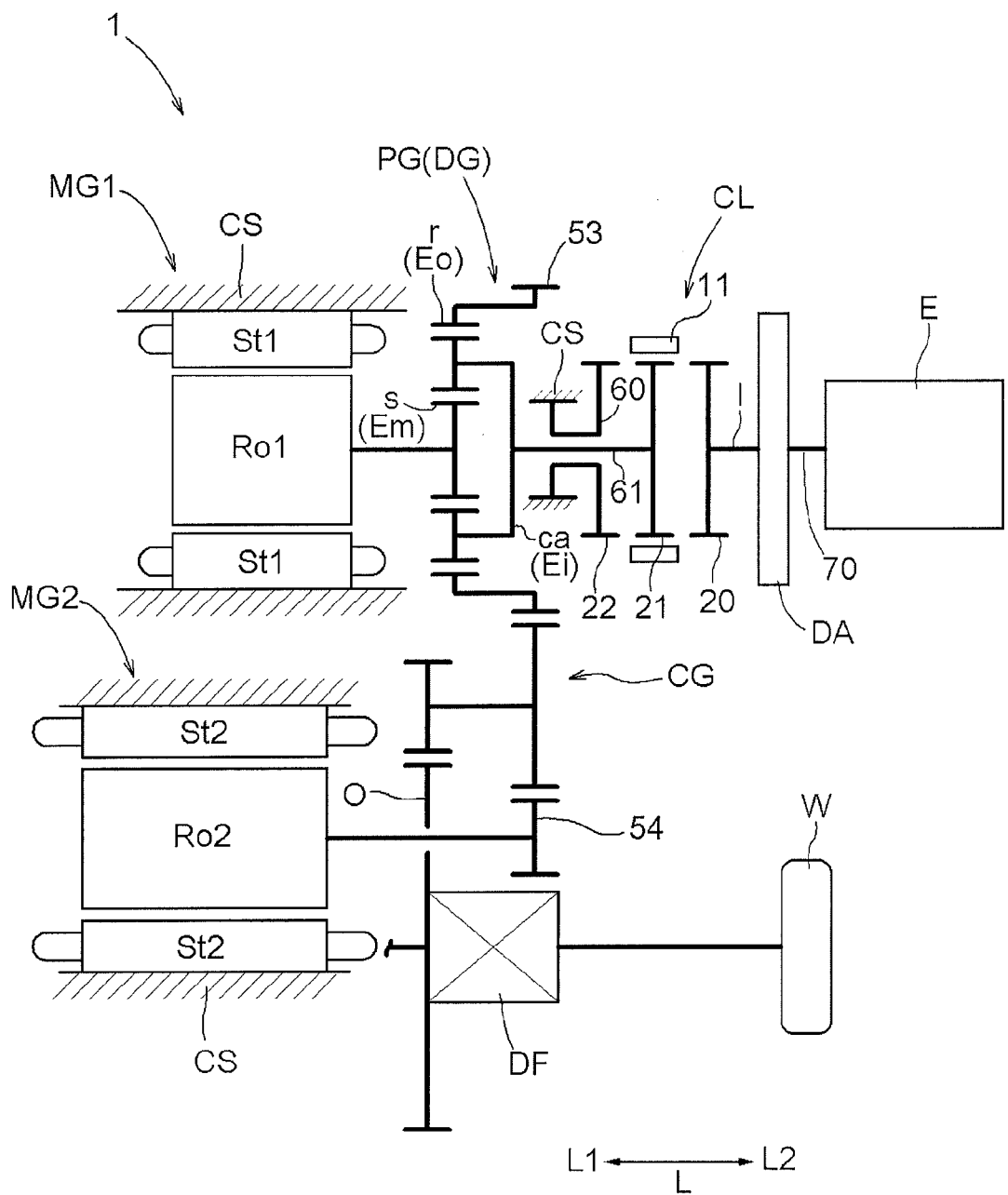
FIG. 1 is a skeleton diagram showing a mechanical configuration of a vehicle drive device according to a first embodiment of the present invention.

A first embodiment of a vehicle drive device according to the present invention will be described below with reference to the accompanying drawings. As shown in FIG. 1, a vehicle drive device 1 includes an input member I that is drivingly coupled to an internal combustion engine E, an output member O that is drivingly coupled to wheels W, a first rotating electrical machine MG1, a second rotating electrical machine MG2, and a differential gear unit DG having at least three rotating elements. The first rotating electrical machine MG1, the input member I, and the output member O are respectively drivingly coupled to the different rotating elements of the differential gear unit DG without interposing the other rotating elements of the differential gear unit DG therebetween. The second rotating electrical machine MG2 is drivingly coupled to the rotating element of the differential gear unit DG other than the rotating element to which the first rotating electrical machine MG1 is drivingly coupled, without interposing the other rotating elements of the differential gear unit DG therebetween.

The vehicle drive device 1 includes a dog engagement device CL on a power transmission path between the input member I and an input rotating element Ei. The input rotating element Ei is the rotating element of the differential gear unit DG to which the input member I is drivingly coupled without interposing the other rotating elements of the differential gear unit DG therebetween. Each of a hybrid drive mode, a first electric drive mode, and a second electric drive mode, which are described below, can be implemented as a drive mode of the vehicle by switching the state of the engagement device CL. The configuration of the vehicle drive device 1 according to the present embodiment will be described in detail below.

In the following description, the "axial direction L" is defined based on the central axis of the differential gear unit DG unless otherwise specified. The "axial first direction L1" represents the direction from the internal combustion engine E toward the differential gear unit DG along the axial direction L (the leftward direction in FIGS. 1 and 6), and the "axial second direction L2" represents the direction opposite to the axial first direction L1 (the rightward direction in FIGS. 1 and 6). The direction of each member represents the direction of that member in the assembled state of the vehicle drive device 1.

1-1. Overall Configuration of Vehicle Drive Device

First, the overall configuration of the vehicle drive device 1 according to the present embodiment will be described. As shown in FIG. 1, the vehicle drive device 1 according to the present embodiment is configured as a drive device for so-called 2-motor split type hybrid vehicles, which includes the differential gear unit DG for power distribution that distributes output torque of the internal combustion engine E to the first rotating electrical machine MG1 and to the wheels W and the second rotating electrical machine MG2. As shown in FIG. 1, in the present embodiment, the differential gear unit DG is formed by a single-pinion type planetary gear mechanism PG. That is, in this example, the differential gear unit DG has three rotating elements, specifically a sun gear s, a carrier ca, and a ring gear r.

The first rotating electrical machine MG1 is drivingly coupled to the sun gear s without interposing the other rotating elements of the differential gear unit DG therebetween. In the case where the "first rotating electrical machine coupling element Em" refers to the rotating element of the differential gear unit DG to which the first rotating electrical machine MG1 is drivingly coupled without interposing the other rotating elements of the differential gear unit DG therebetween, the sun gear s is the first rotating electrical machine coupling element Em in this example. The first rotating electrical machine MG1 has a first stator St1 fixed to a case CS, and a first rotor Ro1 rotatably supported radially inward of the first stator St1. In the present embodiment, the first rotor Ro1 is drivingly coupled to the sun gear s as the first rotating electrical machine coupling element Em so as to rotate together therewith. Although details are omitted, the case CS is provided so as to accommodate at least the rotating electrical machines MG1, MG2 and the differential gear unit DG. In this example, the engagement device CL, a damper DA, a flywheel 30 (see FIG. 6), and an output differential gear unit DF are also accommodated in the case CS.

The input member I is drivingly coupled to the carrier ca without interposing the other rotating elements of the differential gear unit DG therebetween. That is, in this example, the carrier ca is the input rotating element Ei. As described above, the dog engagement device CL is provided on the power transmission path between the input member I and the input rotating element Ei. As shown in FIG. 1, an input rotating element coupling member 61 (in this example, a shaft member) is coupled to the carrier ca as the input rotating element Ei so as to rotate together therewith. Thus, the input member I is drivingly coupled to the carrier ca via the engagement device CL and the input rotating element coupling member 61.

In the present embodiment, the input member I is a shaft member (input shaft), and the damper DA and the flywheel 30 are provided between the input member I and an output shaft of the internal combustion engine E (internal combustion engine output shaft 70). That is, in this example, the input member I is drivingly coupled to the internal combustion engine E via the damper DA and the flywheel 30. The internal combustion engine E is a motor that outputs power by combustion of fuel, and for example, a spark ignition engine such as a gasoline engine, a compression ignition engine such as a diesel engine, etc. can be used as the internal combustion engine E.

The output member O and the second rotating electrical machine MG2 are drivingly coupled to the ring gear r without interposing the other rotating elements of the differential gear unit DG therebetween. In the case where the "output rotating element Eo" refers to the rotating element of the differential gear unit DG to which the output member O is drivingly coupled without interposing the other rotating elements of the differential gear unit DG therebetween, the ring gear r is the output rotating element Eo in this example. Thus, in the present embodiment, the second rotating electrical machine MG2 is drivingly coupled to the rotating element (in this example, the output rotating element Eo) of the differential gear unit DG other than the first rotating electrical machine coupling element Em and other than the input rotating element Ei without interposing the other rotating elements of the differential gear unit DG therebetween.

In the present embodiment, the output member O and the second rotating electrical machine MG2 are drivingly coupled to the ring gear r via a counter gear mechanism CG. As shown in FIG. 1, in this example, the ring gear r is formed integrally with a counter drive gear 53 meshing with a gear of the counter gear mechanism CG. The second rotating electrical machine MG2 has a second stator St2 fixed to the case CS and a second rotor Ro2 rotatably supported radially inward of the second stator St2. The second rotor Ro2 is drivingly coupled to a second rotating electrical machine output gear 54 meshing with the gear of the counter gear mechanism CG, so as to rotate with the second rotating electrical machine output gear 54. Thus, the second rotating electrical machine MG2 is drivingly coupled to the ring gear r via the counter gear mechanism CG.

The output member O is a gear member in this example, and is placed so as to mesh with the gear of the counter gear mechanism CG. Thus, the output member O is drivingly coupled to the ring gear r via the counter gear mechanism CG. In this example, the output member O is a differential input gear included in the output differential gear unit DF, and torque transferred to the differential input gear (output member O) is distributed to the plurality of wheels W by the output differential gear unit DF. The output differential gear unit DF is, e.g., a differential gear mechanism using a plurality of bevel gears meshing with each other.

As described later in detail in the section "1-2. Configuration of Engagement Device," the engagement device CL is configured so as to be switchable among three states, namely a first state, a second state, and a third state. The "first state" is the state where the input rotating element Ei (in this example, the carrier ca) and the input member I are brought into the coupled state, and the input rotating element Ei and a non-rotating member 60 are brought into the non-coupled state. As described below, the non-rotating member 60 is fixed to the case CS in this example.

Figure 2:
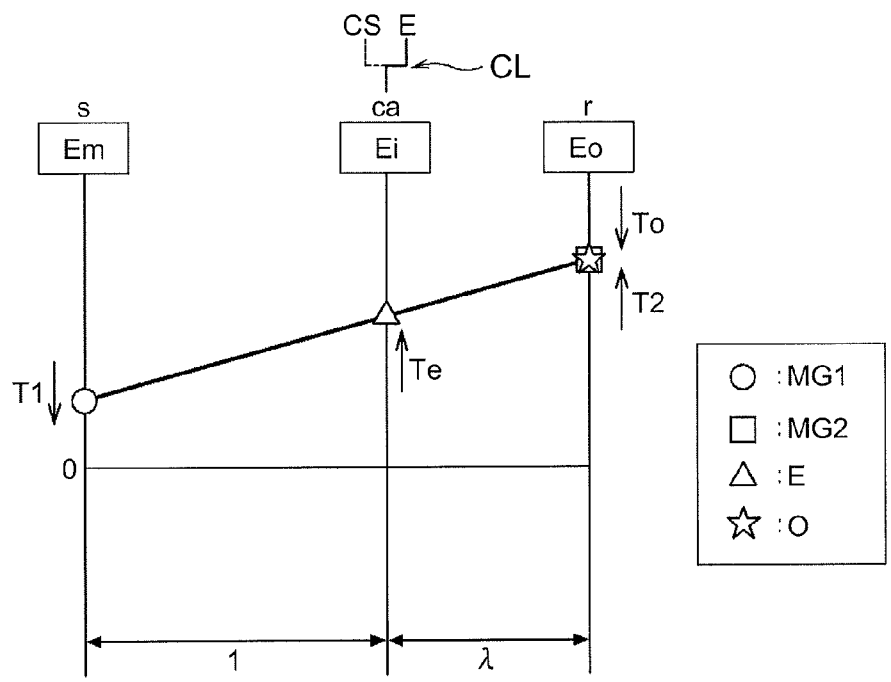
FIG. 2 is a speed diagram showing an example of the operating state of a differential gear unit in a first state according to the first embodiment of the present invention.

Since the engagement device CL is a dog engagement device as described above, the two rotating elements (engagement portion) that are brought into the coupled state by the engagement device CL are engaged (engaged in a directly coupled state) so as to rotate together. Thus, in this example, the input rotating element Ei and the input member I rotate together in the first state. As shown in FIG. 2, the hybrid drive mode in which the vehicle is moved by the output torque of both the internal combustion engine E and the rotating electrical machines MG1, MG2 is implemented in the first state.

FIG. 2 is a speed diagram representing an operating state of the differential gear unit DG. In FIG. 2 and each speed diagram that is referred to below, the ordinate corresponds to the rotational speed of each rotating element of the differential gear unit DG. That is, "0" on the ordinate shows that the rotational speed is zero, the region above "0" shows positive rotation (the rotational speed is positive), and the region below "0" shows negative rotation (the rotational speed is negative). A plurality of parallel vertical lines correspond to the rotating elements of the differential gear unit DG, respectively, and each interval between the vertical lines corresponding to the rotating elements corresponds to the gear ratio λ of the differential gear unit DG. At the position corresponding to each rotating element is shown, a reference character representing the member with which that rotating element is brought into the coupled state.

As can be seen from FIG. 2, in the present embodiment, the order of the rotational speeds of the three rotating elements of the differential gear unit DG is the first rotating electrical machine coupling element Em, the input rotating element Ei, and the output rotating element Eo. Thus, in the present embodiment, the hybrid drive mode that is implemented in the first state is a split drive mode, in which the output torque of the internal combustion engine E transferred to the differential gear unit DG via the input member I and the engagement device CL is transferred to the output member O while being distributed to the first rotating electrical machine MG1, whereby the vehicle is moved.

Specifically, in the split drive mode, the internal combustion engine E outputs torque in the positive direction (internal combustion engine torque Te) according to a driving force required to move the vehicle, and this torque is transferred to the input rotating element Ei via the input member I. The first rotating electrical machine MG1 basically outputs torque in the negative direction (first rotating electrical machine torque T1) to function as an element that receives a reaction force of the internal combustion engine torque Te. Thus, the internal combustion engine torque Te can be transferred to the output rotating element Eo (output member O) to which driving torque (driving resistance) To is transferred from the wheel W side, which moves the vehicle, and the first rotating electrical machine MG1 can be made to generate electricity during positive rotation of the first rotating electrical machine MG1. The second rotating electrical machine MG2 outputs torque in the positive direction (second rotating electrical machine torque T2) as necessary to supplement the torque to be transferred to the output member O.

The "second state" is the state where the input rotating element Ei is brought into the non-coupled state with both the input member I and the non-rotating member 60. The electric drive mode (EV drive mode) in which the vehicle is moved only by the output torque of the rotating electrical machine MG2 is implemented in the second state. The electric drive mode that is implemented in the second state is hereinafter referred to as the "first electric drive mode."

Figure 3:
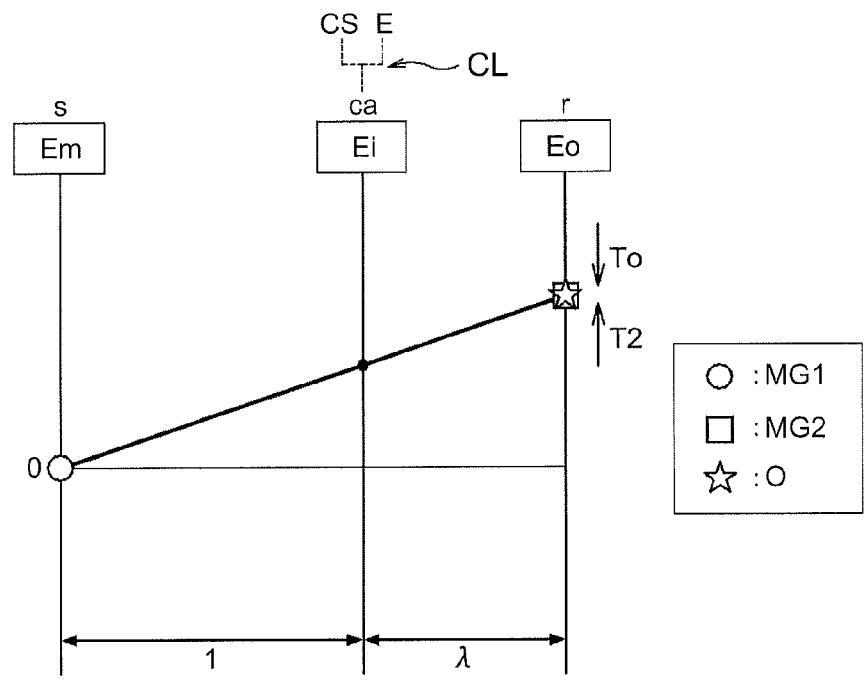
FIG. 3 is a speed diagram showing an example of the operating state of the differential gear unit in a second state according to the first embodiment of the present invention.

As shown in FIG. 3, the first electric drive mode according to the present embodiment is an electric drive mode in which the vehicle is moved only by the output torque of the second rotating electrical machine MG2. Specifically, in the second state, the input rotating element Ei is freely rotatable independently of the internal combustion engine E (input member I) and the case CS (non-rotating member 60). Thus, no torque is transferred via the first rotating electrical machine coupling element Em and the input rotating element Ei, and only the torque of the second rotating electrical machine MG2 drivingly coupled to the output rotating element Eo is transferred to the output member O drivingly coupled to the output rotating element Eo. The second rotating electrical machine MG2 outputs the torque according to the required driving force to move the vehicle.

Figure 4:
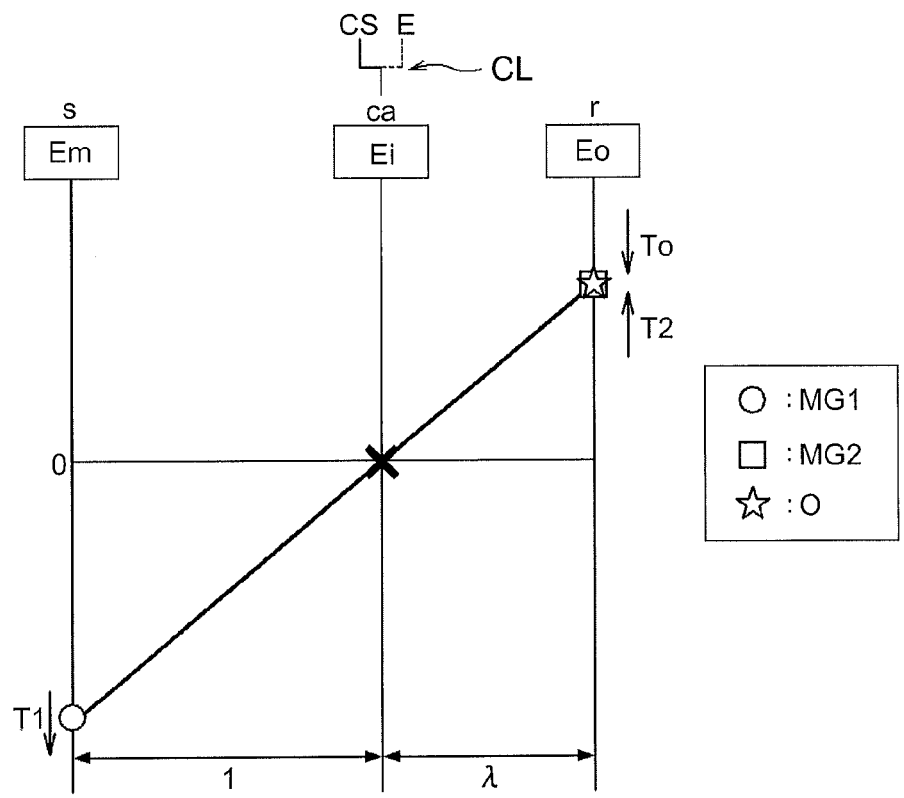
FIG. 4 is a speed diagram showing an example of the operating state of the differential gear unit in a third state according to the first embodiment of the present invention.

The "third state" is the state where the input rotating element Ei and the non-rotating member 60 are brought into the coupled state. Thus, the input rotating element Ei is held stationary with respect to the non-rotating member 60 (case CS), and its rotational speed is restricted to zero. Moreover, in the present embodiment, the input rotating element Ei and the input member I are brought into the non-coupled state in the third state. As shown by the speed diagram of FIG. 4, the electric drive mode different from the first electric drive mode (hereinafter referred to as the "second electric drive mode") is implemented in the third state. In the second electric drive mode, unlike the first electric drive mode, the input rotating element Ei functions as an element that receives a reaction force of the torque of the rotating electrical machines MG1, MG2, which moves the vehicle. In FIG. 4, the "X"-shaped symbol indicates that the rotational speed of the input rotating element Ei is restricted to zero in the third state.

As shown in FIG. 4, in the second electric drive mode according to the present embodiment, the vehicle is moved by the output torque of both the first rotating electrical machine MG1 and the second rotating electrical machine MG2. Specifically, in the third state, since the rotational speed of the input rotating element Ei is restricted to zero, the torque in the negative direction that is output from the first rotating electrical machine MG1 (first rotating electrical machine torque T1) can be reversed in direction to the positive direction, and transferred to the output rotating element Eo (output member O). That is, in the second electric drive mode, not only the second rotating electrical machine torque T2 but also the first rotating electrical machine torque T1 can be used to move the vehicle. Accordingly, relatively large torque can be transferred to the output member O to move the vehicle without using the torque of the internal combustion engine E. In the third state, only one of the first rotating electrical machine MG1 and the second rotating electrical machine MG2 may be made to output torque to move the vehicle.

1-2. Configuration of Engagement Device

The configuration of the engagement device CL as a main part of the vehicle drive device 1 according to the present embodiment will be described below. As described above, the engagement device CL is a dog engagement device, and the engagement device CL is configured to be switchable among three states, namely the first state implementing the hybrid drive mode, the second state implementing the first electric drive mode, and the third state implementing the second electric drive mode.

Figure 5:
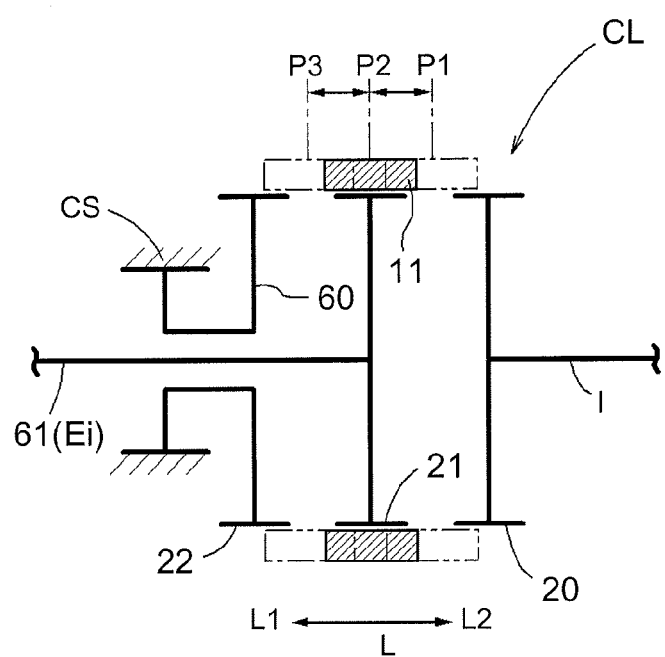
FIG. 5 is a diagram illustrating operation of an engagement device according to the first embodiment of the present invention.
Figure 6:
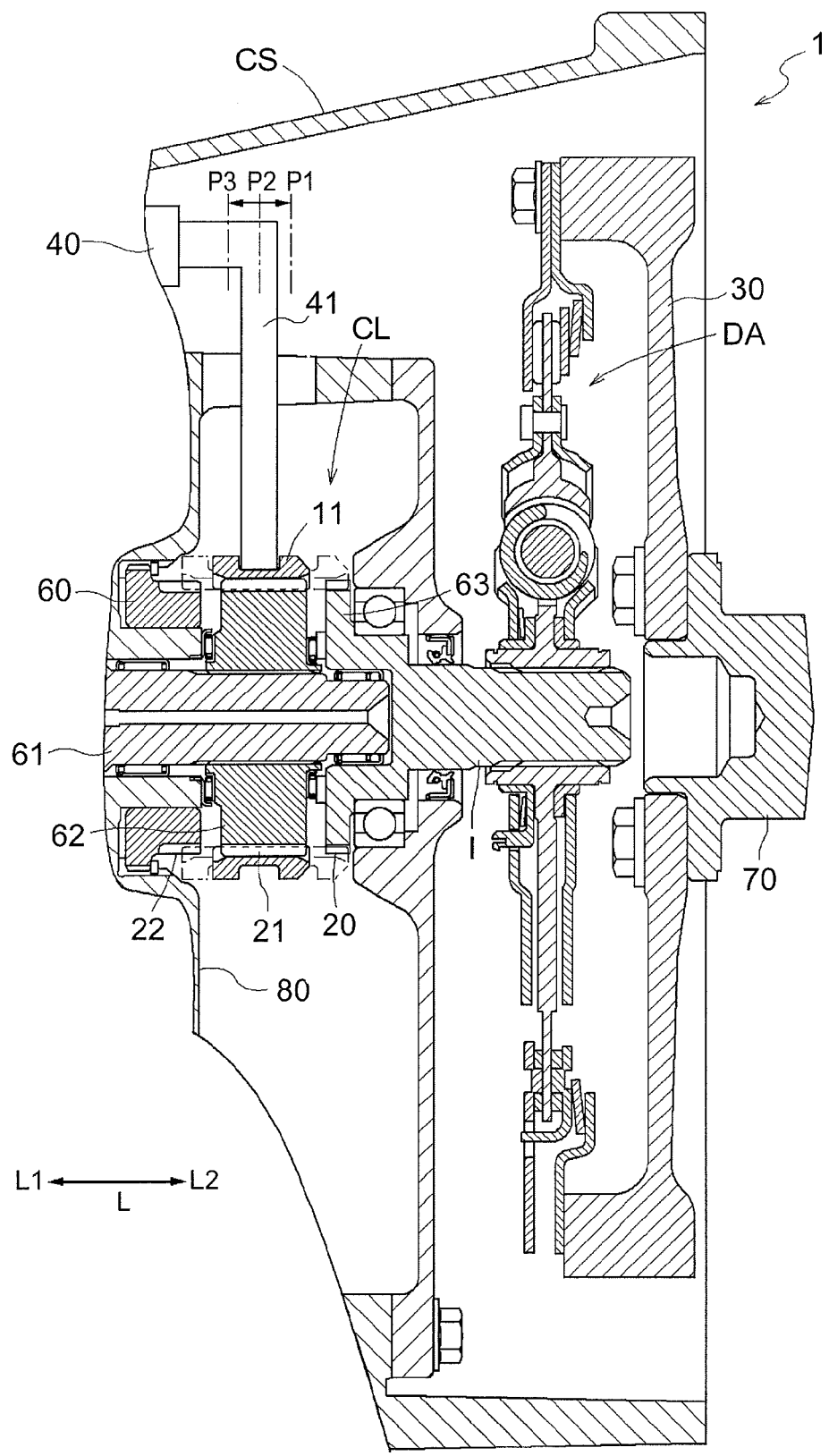
FIG. 6 is a partial sectional view of the vehicle drive device according to the first embodiment of the present invention taken along the axial direction.

As shown in FIGS. 1, 5, and 6, the engagement device CL includes a state selecting member 11 that switches the state among the first, second, and third states. The state electing member 11 is placed so as to be movable along the axial direction L between the internal combustion engine E and the differential gear unit DG in the axial direction L. As shown in FIG. 5, the state selecting member 11 is configured so that a first position P1 implementing the first state, a second position P2 implementing the second state, and a third position P3 implementing the third state can be selected as its axial L position. The state selecting member 11 located at the second position P2 is shown hatched in FIG. 5 and FIGS. 10, 12, and 14 that are referred to later.

Specifically, the state selecting member 11 is configured to selectively mesh with an input member engagement portion 20, an input rotating element engagement portion 21, and an non-rotating member engagement portion 22. The input member engagement portion 20 is an engagement portion provided in the input member I, and in the present embodiment, is provided so as to rotate together with the input member I. The input rotating element engagement portion 21 is an engagement portion provided in the input rotating element Ei, and in the present embodiment, is provided so as to rotate together with the input rotating element Ei (specifically, the input rotating element coupling member 61 that rotates together with the input rotating element Ei). The non-rotating member engagement portion 22 is an engagement portion provided in the non-rotating member 60, and in the present embodiment, is provided integrally with the non-rotating member 60 fixed to the case CS.

The state selecting member 11 selectively meshes with the engagement portions 20, 21, 22 to implement each of the first, second, and third states. Specifically, in the first state, the input rotating element Ei and the input member I are brought into the coupled state, and the input rotating element Ei and the non-rotating member 60 are brought into the non-coupled state. In order to implement such a first state at the first position P1, as shown in FIG. 5, the state selecting member 11 is configured to mesh with both the input member engagement portion 20 and the input rotating element engagement portion 21 and not to mesh with the non-rotating member engagement portion 22 when located at the first position P1.

In the third state, the input rotating element Ei and the non-rotating member 60 are brought into the coupled state. In order to implement such a third state at the third position P3, the state selecting member 11 is configured to mesh with both the input rotating element engagement portion 21 and the non-rotating member engagement portion 22 when located at the third position P3. In the present embodiment, the input rotating element Ei and the input member I are brought into the non-coupled state in the third state. Thus, in the present embodiment, as shown in FIG. 5, the state selecting member 11 is configured to mesh with both the input rotating element engagement portion 21 and the non-rotating member engagement portion 22 and not to mesh with the input member engagement portion 20 when located at the third position P3. In the present embodiment, the non-rotating member engagement portion 22 is provided on the axial first direction L1 side with respect to the input member engagement portion 20. Accordingly, the third position P3 is located on the axial first direction L1 side with respect to the first position P1. That is, in the present embodiment, the first position P1 is provided on the axial second direction L2 side (the internal combustion engine E side in the axial direction L) with respect to the third position P3.

In the second state, the input rotating element Ei is brought into the non-coupled state with both the input member I and the non-rotating member 60. In order to implement such a second state at the second position P2, the state selecting member 11 is configured not to mesh with any of the engagement portions 20, 21, 22, or to mesh with only one of the engagement portions 20, 21, 22 when located at the second position P2. In the present embodiment, as shown in FIG. 5, the state selecting member 11 is configured to mesh only with the input rotating element engagement portion 21 when located at the second position P2. Thus, in the present embodiment, the second position P2 is located between the first position P1 and the third position P3 in the axial direction L. In other words, in the present embodiment, the second position P2 and the third position P3 are located so as to adjoin each other along the axial direction L. In the present embodiment, the first position P1, the second position P2, and the third position P3 are located in this order from the axial second direction L2 side along the axial direction L, and the first position P1 and the third position P3 are the two positions located on both sides in the axial direction L. That is, in the present embodiment, the first position P1 and the third position P3 correspond to the "two end positions" in the present invention.

The specific configurations of the state selecting member 11, the input member engagement portion 20, the input rotating element engagement portion 21, and the non-rotating member engagement portion 22 will be described. In the present embodiment, as shown in FIG. 6, all of the input member engagement portion 20, the input rotating element engagement portion 21, and the non-rotating member engagement portion 22 are externally-toothed engagement portions. Specifically, the input member engagement portion 20 is formed on the outer peripheral surface of a flange portion 63 formed at an end of the input member I on the axial first direction L1 side. The input rotating element engagement portion 21 is formed on the outer peripheral surface of a cylindrical member (hub member) 62 spline-engaged with the outer peripheral surface of the input rotating element coupling member 61. The non-rotating member engagement portion 22 is formed on the outer peripheral surface of the cylindrical non-rotating member 60 fixed to a wall 80 of the case CS. In the present embodiment, the input member engagement portion 20, the input rotating element engagement portion 21, and the non-rotating member engagement portion 22 are externally-toothed engagement portions having the same diameter and placed coaxially with each other.

In the present embodiment, as shown in FIG. 1, the internal combustion engine E and the differential gear unit DG are placed coaxially with each other. This facilitates coaxially placing the input member I (flange portion 63), the input rotating element coupling member 61 (cylindrical member 62), and the non-rotating member 60, and providing the input member engagement portion 20, the input rotating element engagement portion 21, and the non-rotating member engagement portion 22 as externally-toothed engagement portions having the same diameter as described above.

As shown in FIG. 6, in the present embodiment, the input rotating element engagement portion 21 is placed on the axial first direction L1 side with respect to the input member engagement portion 20, and the non-rotating member engagement portion 22 is located on the axial first direction L1 side with respect to the input rotating element engagement portion 21. That is, in the present embodiment, the input member engagement portion 20, the input rotating element engagement portion 21, and the non-rotating member engagement portion 22 are arranged in this order from the axial second direction L2 side along the axial direction L.

The state selecting member 11 includes an internally-toothed engagement portion capable of engaging with the input member engagement portion 20, the input rotating element engagement portion 21, and the non-rotating member engagement portion 22. Specifically, as shown in FIG. 6, the state selecting member 11 is formed in a cylindrical shape (sleeve shape). The inner peripheral surface of the state selecting member 11 can be fitted on the flange portion 63 of the input member I, the cylindrical member 62 fixed to the input rotating element coupling member 61, and the non-rotating member 60, and internal teeth are formed on the inner peripheral surface. An engagement portion with a positioning member 41 that moves (slides) the state selecting member 11 in the axial direction L (in this example, a groove along the circumferential direction) is formed on the outer peripheral surface of the state selecting member 11. The axial direction L position of the state selecting member 11 can be switched among the first position P1, the second position P2, and the third position P3 by switching the axial direction L position of the positioning member 41 by an actuator 40. In the present embodiment, the actuator 40 functions as the "control portion" that controls operation of the state selecting member 11.

1-3. Switching of Drive Mode by Engagement Device

Switching of the drive mode by the engagement device CL according to the present embodiment will be described. As described above, the engagement device CL is a dog engagement device, and is configured to be switchable among the three states, namely the first state, the second state, and the third state. The vehicle drive device 1 is configured so that the hybrid drive mode (in this example, the split drive mode) is implemented in the first state of the engagement device CL, the first electric drive mode is implemented in the second state, and the second electric drive mode is implemented in the third state. Thus, the vehicle drive device 1 switches the drive mode by switching the state of the engagement device CL among the first state, the second state, and the third state. In the following description, the actuator 40 that switches the state of the engagement device CL, the internal combustion engine E, the first rotating electrical machine MG1, and the second rotating electrical machine MG2 are controlled by a control unit (not shown) that controls the vehicle drive device 1.

Figure 7:
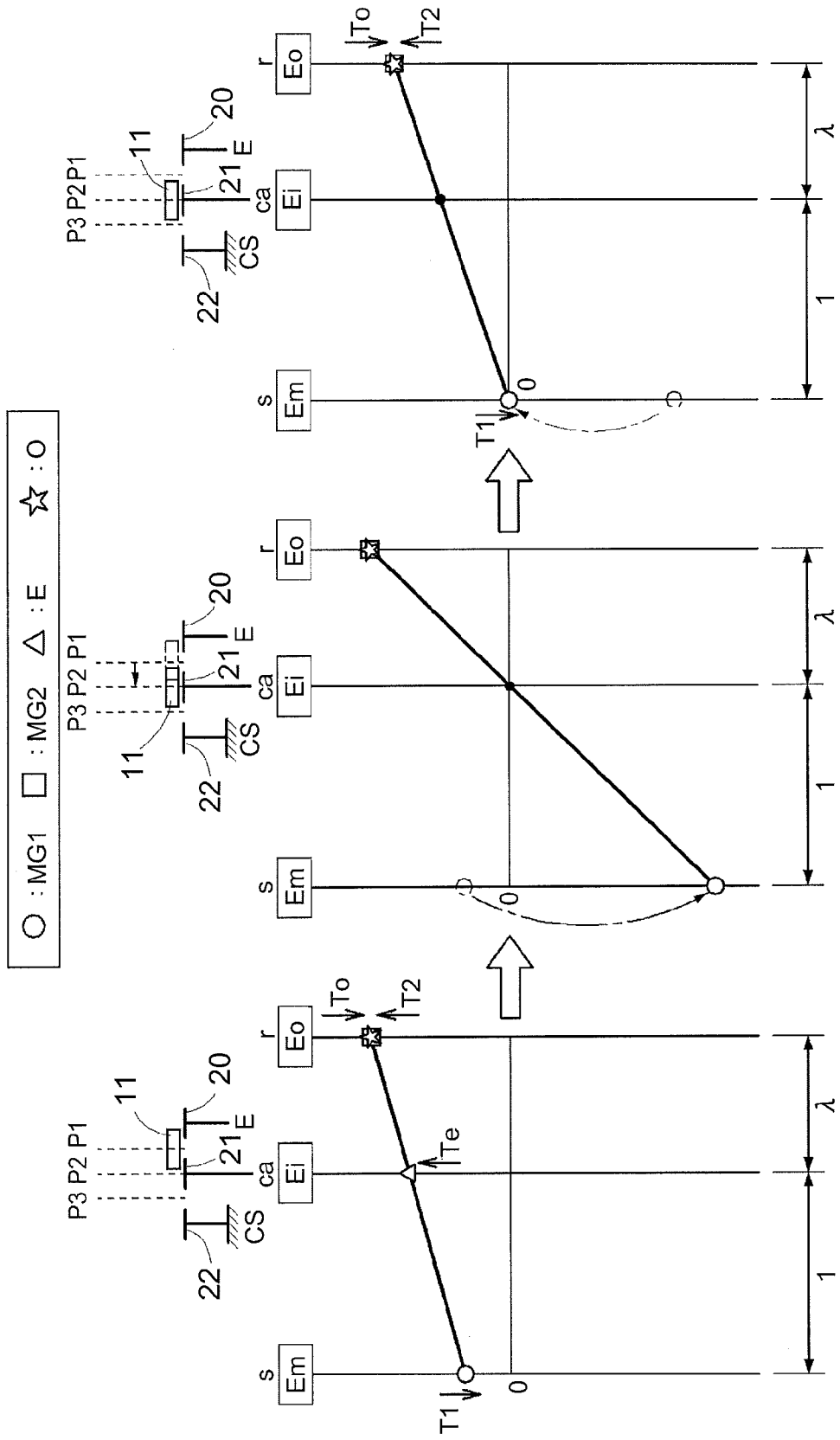
FIG. 7 shows speed diagrams showing how the operating state of the differential gear unit changes during transition from the first state to the second state according to the first embodiment of the present invention.

FIG. 7 shows speed diagrams showing how the operating state of the differential gear unit DG changes during mode transition from the hybrid drive mode that is implemented in the first state of the engagement device CL to the first electric drive mode that is implemented in the second state thereof. The state during transition from the hybrid drive mode shown at the left end to the first electric drive mode shown at the right end is shown in the middle of FIG. 7. Each speed diagram is shown with a schematic diagram of the engagement device CL similar to FIG. 5.

In the hybrid drive mode, the state selecting member 11 is located at the first position P1, and meshes with both the input member engagement portion 20 and the input rotating element engagement portion 21. Thus, the internal combustion engine E and the input member I are in the coupled state with the input rotating element Ei (in this example, the carrier ca). During mode transition from the hybrid drive mode to the first electric drive mode, spark ignition in the internal combustion engine E is first stopped. Thus, the internal combustion engine E does not output torque in the positive direction. In this state, the rotational speed of the first rotating electrical machine MG1 is controlled so that the rotational speed of the input rotating element Ei coupled to the input member I so as to rotate therewith is zero. With the rotational speeds of both the input rotating element Ei and the input member I being zero, the state selecting member 11 is shifted from the first position P1 to the second position P2. That is, the engagement device CL is switched from the first state to the second state by synchronous switching at the rotational speed of zero.

In the second state of the engagement device CL where the state selecting member 11 is located at the second position P2, the state selecting member 11 meshes only with the input rotating element engagement portion 21, and does not mesh with the input member engagement portion 20 and the non-rotating member engagement portion 22. Thus, the internal combustion engine E and the input member I are brought into the non-coupled state with the input rotating element Ei. Then, with the internal combustion engine E being stopped (with the rotational speed being zero), the rotational speed of the first rotating electrical machine MG1 is controlled to zero. Such rotational speed control of the first rotating electrical machine MG1 may not be actively performed, and the rotational speed of the first rotating electrical machine MG1 may be allowed to change freely. The second rotating electrical machine MG2 is controlled so as to output torque according to a required driving force. Transition to the first electric drive mode is thus completed.

Figure 8:
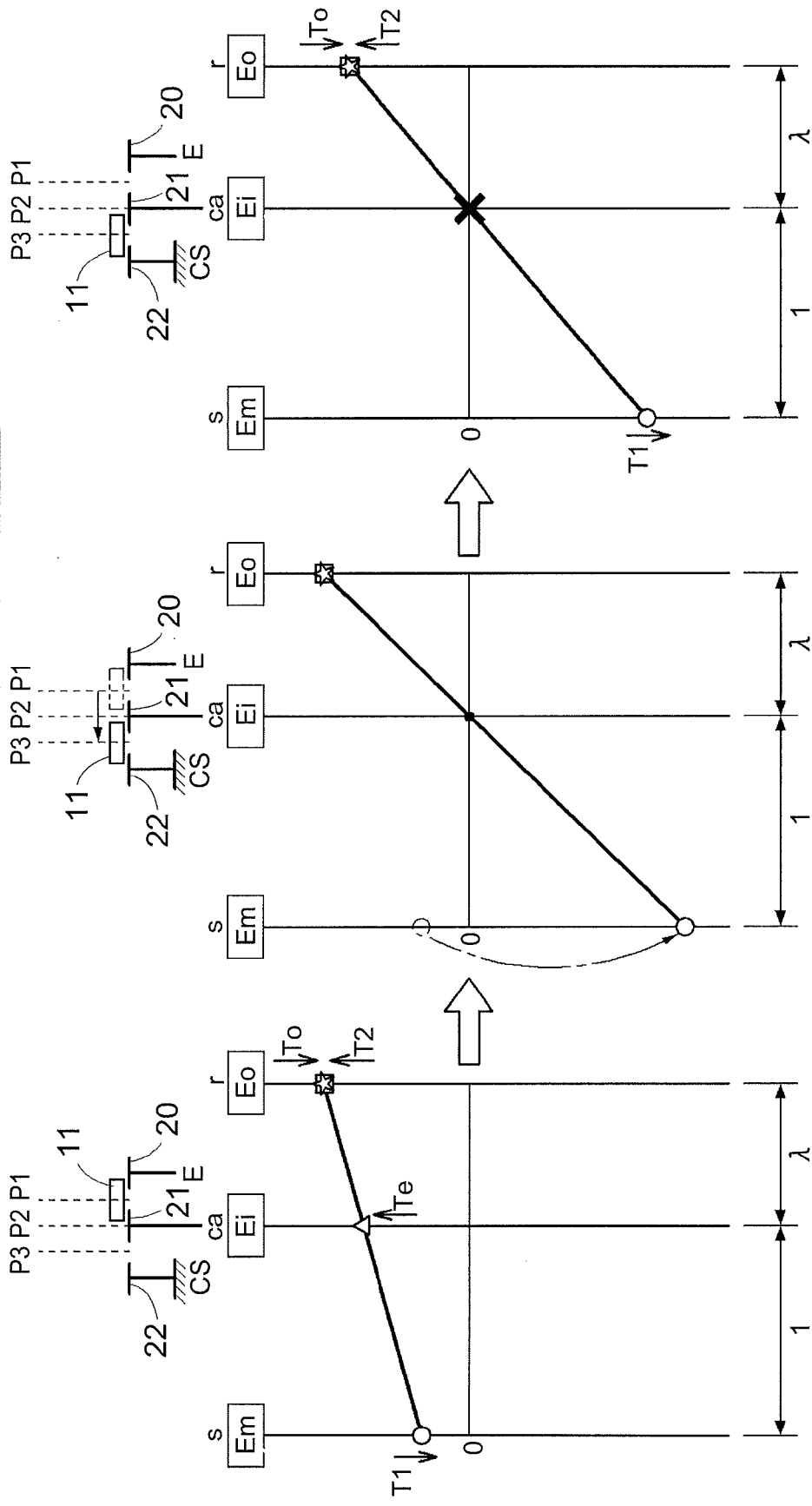
FIG. 8 shows speed diagrams showing how the operating state of the differential gear unit changes during transition from the first state to the third state according to the first embodiment of the present invention.

FIG. 8 shows speed diagrams showing how the operating state of the differential gear unit DG changes during mode transition from the hybrid drive mode that is implemented in the first state of the engagement device CL to the second electric drive mode that is implemented in the third state thereof. The state during transition from the hybrid drive mode shown at the left end to the second electric drive mode shown at the right end is shown in the middle of FIG. 8.

During mode transition from the hybrid drive mode to the second electric drive mode, spark ignition in the internal combustion engine E is first stopped. Thus, the internal combustion engine E does not output torque in the positive direction. In this state, the rotational speed of the first rotating electrical machine MG1 is controlled so that the rotational speed of the input rotating element Ei coupled to the input member I so as to rotate therewith is zero. Moreover, the torque of the first rotating electrical machine MG1 is controlled so that the output torque of the first rotating electrical machine MG1 is zero. With the rotational speeds of both the input rotating element Ei and the input member I being zero, the state selecting member 11 is shifted from the first position P1 to the third position P3. At this time, the state selecting member 11 is continuously shifted from the first position P1 to the third position P3 without stopping at the second position P2. In this case, the state selecting member 11 may be shifted at either a constant speed or a variable speed. The engagement device CL is switched from the first state to the third state by synchronous switching at the rotational speed of zero.

In the third state of the engagement device CL where the state selecting member 11 is located at the third position P3, the state selecting member 11 meshes with both the input rotating element engagement portion 21 and the non-rotating member engagement portion 22. Thus, the non-rotating member 60 and the input rotating element Ei are brought into the coupled state, and the input rotating element Ei is held stationary with respect to the non-rotating member 60 (case CS). Then, the first rotating electrical machine MG1 is controlled so as to output torque in the negative direction. The first rotating electrical machine MG1 and the second rotating electrical machine MG2 are controlled so as to cooperate to output torque according to a required driving force. Transition to the second electric drive mode is thus completed.

Figure 9:
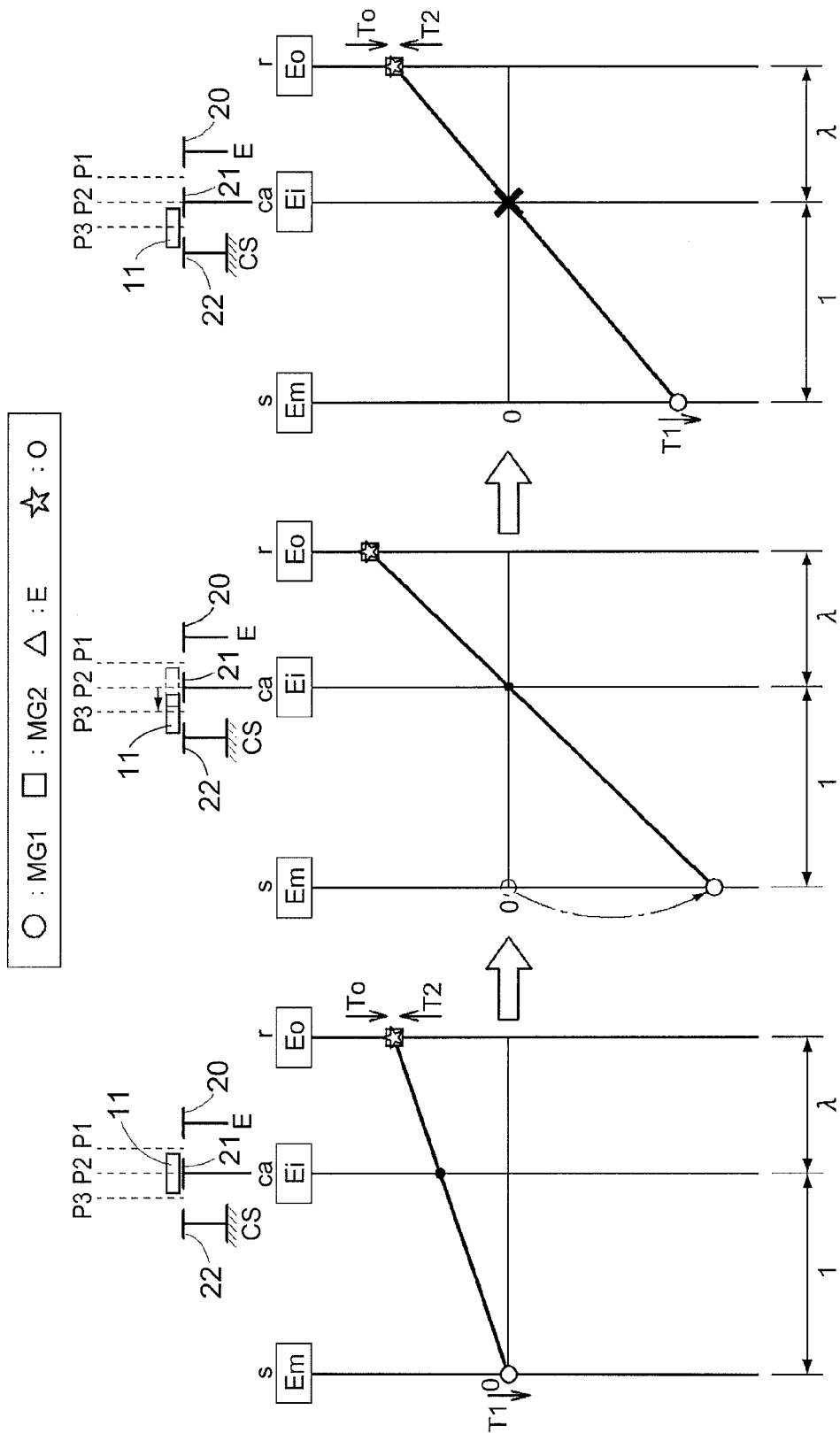
FIG. 9 shows speed diagrams showing how the operating state of the differential gear unit changes during transition from the second state to the third state according to the first embodiment of the present invention.

FIG. 9 shows speed diagrams showing how the operating state of the differential gear unit DG changes during mode transition from the first electric drive mode that is implemented in the second state of the engagement device CL to the second electric drive mode that is implemented in the third state thereof. The state during transition from the first electric drive mode shown at the left end to the second electric drive mode shown at the right end is shown in the middle of FIG. 9.

In the first electric drive mode, the state selecting member 11 is located at the second position P2, and the state selecting member 11 meshes only with the input rotating element engagement portion 21, and does not mesh with the input member engagement portion 20 and the non-rotating member engagement portion 22. Thus, the internal combustion engine E and the input member I are in the non-coupled state with the input rotating element Ei. During mode transition from the first electric drive mode to the second electric drive mode, the rotational speed of the first rotating electrical machine MG1 is first controlled so that the rotational speed of the input rotating element Ei is zero. With the rotational speeds of both the input rotating element Ei and the input member I being zero, the state selecting member 11 is shifted from the second position P2 to the third position P3. That is, the engagement device CL is switched from the second state to the third state by synchronous switching at the rotational speed of zero.

In the third state of the engagement device CL where the state selecting member 11 is located at the third position P3, the state selecting member 11 meshes with both the input rotating element engagement portion 21 and the non-rotating member engagement portion 22. Thus, the non-rotating member 60 and the input rotating element Ei are brought into the coupled state, and the input rotating element Ei is held stationary with respect to the non-rotating member 60 (case CS). Then, the first rotating electrical machine MG1 is controlled so as to output torque in the negative direction. The first rotating electrical machine MG1 and the second rotating electrical machine MG2 are controlled so as to cooperate to output torque according to a required driving force. Transition to the second electric drive mode is thus completed.

Mode transition from the first electric drive mode to the hybrid drive mode, and mode transition from the second electric drive mode to the first electric drive mode or the hybrid drive mode can be implemented by the reverse operation to that described above.

That is, in the first electric drive mode, the internal combustion engine E and the input member I are in the non-coupled state with the input rotating element Ei. In this state, the rotational speed of the first rotating electrical machine MG1 is controlled so that the rotational speed of the input rotating element Ei is zero. With the rotational speeds of both the input rotating element Ei and the input member I being zero, the state selecting member 11 is shifted from the second position P2 to the first position P1. Thus, the internal combustion engine E and the input member I are brought into the coupled state with the input rotating element Ei, and then the internal combustion engine E is started by torque in the positive direction that is output from the first rotating electrical machine MG1. After the internal combustion engine E is started, the output torque of the first rotating electrical machine MG1 is reversed in direction, whereby transition to the hybrid drive mode is completed.

In the second electric drive mode, the non-rotating member 60 and the input rotating element Ei are in the coupled state, the internal combustion engine E is in the stopped state, and the rotational speeds of all of the non-rotating member 60, the input rotating element Ei, and the input member I are zero. In this state, the torque of the first rotating electrical machine MG1 is controlled so that the output torque of the first rotating electrical machine MG1 is zero, and then the state selecting member 11 is shifted from the third position P3 to the second position P2 or the first position P1. At this time, if the state selecting member 11 is shifted from the third position P3 to the second position P2, and then the rotational speed of the first rotating electrical machine MG1 is controlled to zero, transition to the first electric drive mode is completed. Such rotational speed control of the first rotating electrical machine MG1 may not be actively performed, and the rotational speed of the first rotating electrical machine MG1 may be allowed to change freely.

If the state selecting member 11 is continuously shifted from the third position P3 to the first position P1 without stopping at the second position P2, and then the internal combustion engine E is started by torque in the positive direction that is output from the first rotating electrical machine MG1 and the torque of the first rotating electrical machine MG1 is reversed in direction, transition to the hybrid drive mode is completed. In the present embodiment, mode transition between the hybrid drive mode that is implemented in the first state of the engagement device CL (the state where the state selecting member 11 is located at the first position P1) and the second electric drive mode that is implemented in the third state thereof (the state where the state selecting member 11 is located at the third position P3) is the "specific mode transition" in the present invention.

2. Second Embodiment

A second embodiment of the vehicle drive device according to the present invention will be described with reference to FIGS. 10 and 11. The vehicle drive device 1 according to the present embodiment is configured basically similarly to the first embodiment except that the engagement device CL is provided on a power transmission path between the damper DA and the internal combustion engine E rather than on the power transmission path between the damper DA and the differential gear unit DG. The configuration of the vehicle drive device 1 according to the present embodiment will be described mainly with respect to the differences from the first embodiment. The second embodiment is similar to the first embodiment in those points that are not specifically described.

Figure 10:
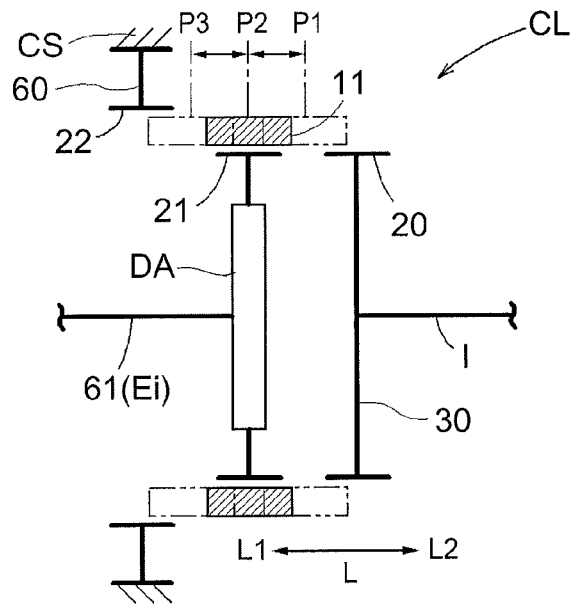
FIG. 10 is a diagram illustrating operation of an engagement device according to a second embodiment of the present invention.
Figure 11:
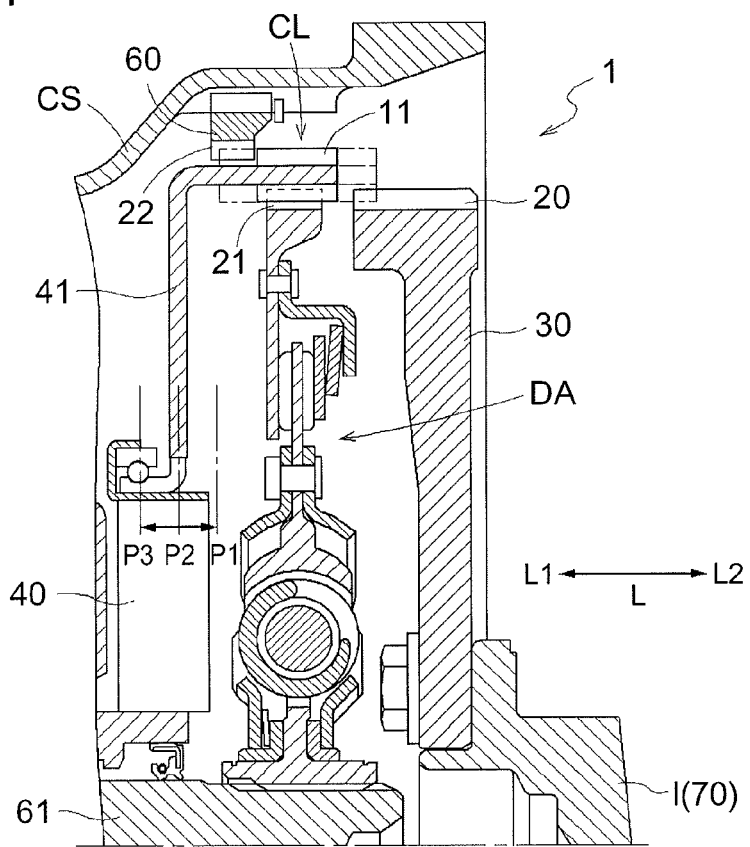
FIG. 11 is a partial sectional view of a vehicle drive device according to the second embodiment of the present invention taken along the axial direction.

As shown in FIGS. 10 and 11, in the present embodiment, the input member I is formed by an internal combustion engine output shaft 70 having the flywheel 30 coupled to its end on the axial first direction L1 side. The input rotating element coupling member 61 is placed so as to extend on the axial second direction L2 side to the inner peripheral surface of an output-side rotating member of the damper DA, and is spline-engaged with the output-side rotating member. In the present embodiment, the flywheel 30 is separated from the damper DA, and the flywheel 30 and the damper DA are selectively coupled by the engagement device CL.

Specifically, the externally-toothed input member engagement portion 20 is formed on the outer peripheral surface of the flywheel 30 located in a coupling portion with the input rotating element Ei (specifically, the damper DA rotating in coordination with the input rotating element Ei) in the input member I. The externally-toothed input rotating element engagement portion 21 is formed on the outer peripheral surface of the damper DA located in a coupling portion with the input member I in the input rotating element Ei (specifically, the damper DA rotating in coordination with the input rotating element Ei). In the present embodiment as well, the axial direction L position of the state selecting member 11 can be shifted among the first position P1, the second position P2, and the third position P3 as shown in FIG. 10 by switching the axial direction L position of the positioning member 41 by the actuator 40.

In the present embodiment, the positioning member 41 is coupled to the state selecting member 11 so as to rotate together therewith. Although details are omitted, the positioning member 41 is configured to move in the axial direction L together with a movable portion of the actuator 40 in the state where the positioning member 41 is relatively rotatably coupled to the movable portion via a bearing.

In the present embodiment, the non-rotating member engagement member 22 is an internally-toothed engagement portion formed on the inner peripheral surface of the case CS. Specifically, the non-rotating member engagement portion 22 having a larger diameter than the input member engagement portion 20 and the input rotating element engagement portion 21 is formed on the inner peripheral surface of the non-rotating member 60 fixed to the inner peripheral surface of the peripheral wall of the case CS. According to this configuration of the non-rotating member engagement portion 22, the state selecting member 11 according to the present embodiment includes on its inner peripheral surface an internally-toothed engagement portion capable of engaging with the input member engagement portion 20 and the input rotating element engagement portion 21, and includes on its outer peripheral surface an externally-toothed engagement portion capable of engaging with the non-rotating member engagement portion 22.

In the present embodiment, as in the first embodiment, the non-rotating member engagement portion 22 is placed on the axial first direction L1 side with respect to the input rotating element engagement portion 21. That is, in the present embodiment, the non-rotating member engagement portion 22 is placed on the axial first direction L1 side with respect to such a position that the non-rotating member engagement portion 22 has a portion overlapping the input rotating element engagement portion 21 as viewed in the radial direction of the differential gear unit DG.

3. Other Embodiments

Lastly, other embodiments according to the present invention will be described. It is not intended that the characteristics disclosed in each of the following embodiments can be used only in that embodiment, and the characteristics can be applied to the other embodiments as long as no consistency arises.

Figure 12:
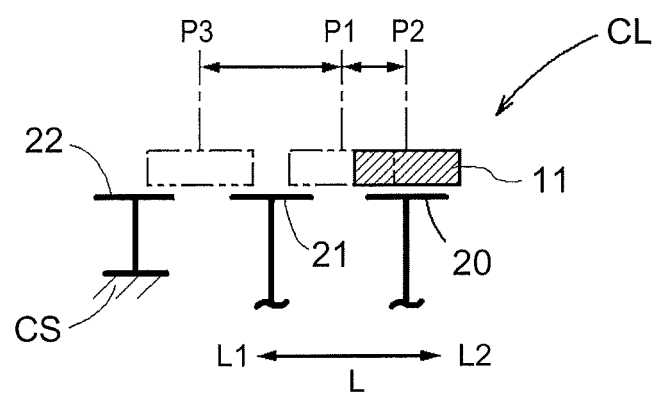
FIG. 12 is a diagram illustrating operation of an engagement device according to another embodiment of the present invention.

(1) The first and second embodiments are described with respect to an example in which the state selecting member 11 meshes only with the input rotating element engagement portion 21 when located at the second position P2. However, embodiments of the present invention are not limited to these, and the state selecting member 11 may mesh only with the input member engagement portion 20 or only with the non-rotating member engagement portion 22 when located at the second position P2. FIG. 12 shows the configuration in which the state selecting member 11 meshes only with the input member engagement portion 20 when located at the second position P2. In such a configuration, unlike the first and second embodiments, the second position P2 and the third position P3 are not located so as to adjoin each other along the axial direction L, and the first position P1 is located between the second position P2 and the third position P3 in the axial direction L. The second position P2, the first position P1, and the third position P3 are located in this order from the axial second direction L2 side along the axial direction L, and the second position P2 and the third position P3 are the two positions located on both sides in the axial direction L. In this configuration, the second position P2 and the third position P3 correspond to the "two end positions" in the present invention.

Figure 13:
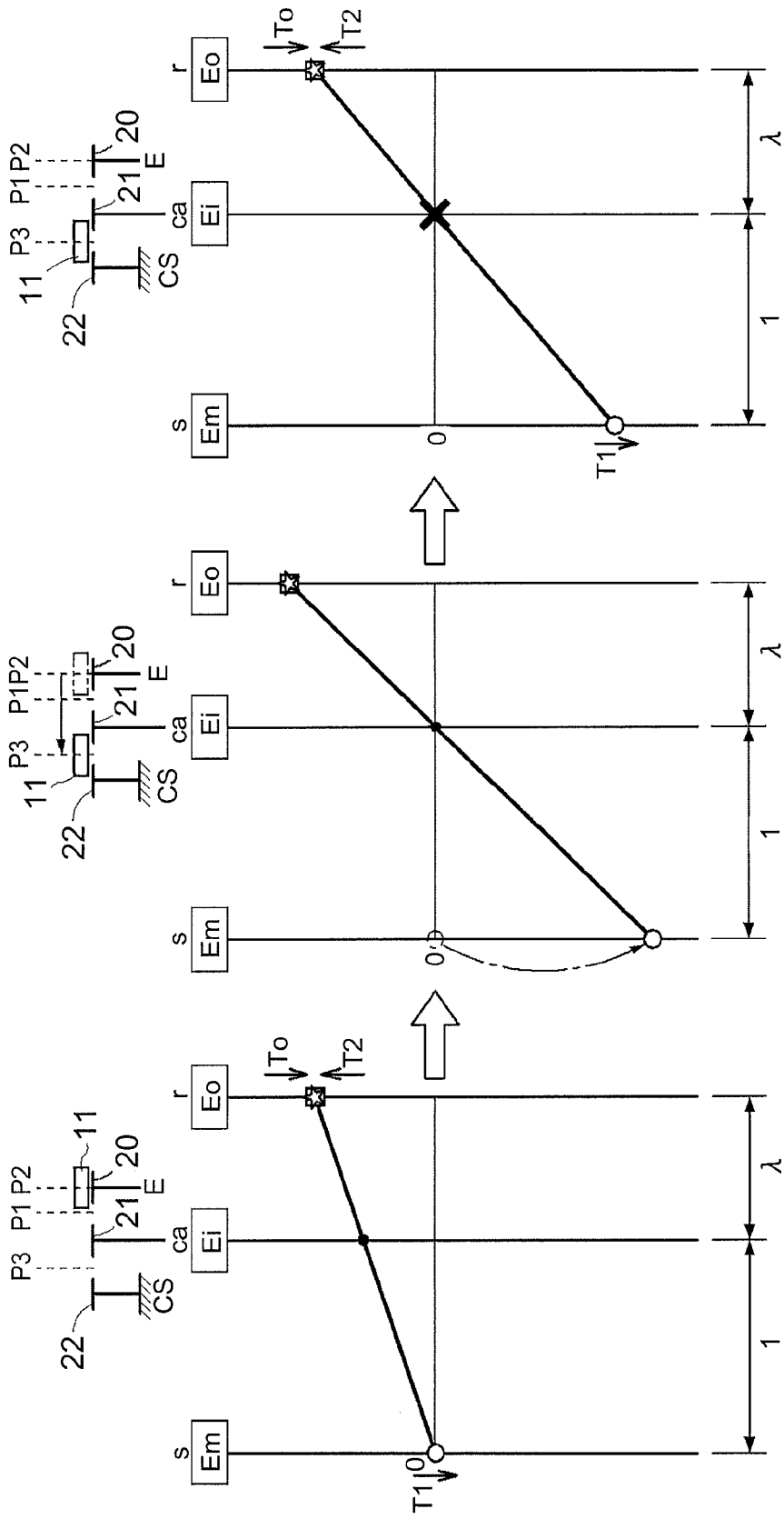
FIG. 13 shows speed diagrams showing how the operating state of a differential gear unit changes during transition from a second state to a third state according to the another embodiment of the present invention.

FIG. 13 shows an example of switching the drive mode in this case. FIG. 13 shows how the operating state of the differential gear unit DG changes during mode transition from the first electric drive mode that is implemented in the second state of the engagement device CL to the second electric drive mode that is implemented in the third state thereof. Although detailed description is omitted, in mode transition from the first electric drive mode to the second electric drive mode, the state selecting member 11 is shifted from the second position P2 to the third position P3 with the rotational speeds of both the input rotating element Ei and the input member I being zero in the course of the transition. At this time, the state selecting member 11 is continuously shifted from the second position P2 to the third position P3 without stopping at the first position P1. In this configuration, mode transition between the first electric drive mode that is implemented in the second state of the engagement device CL (the state where the state selecting member 11 is located at the second position P2) and the second electric drive mode that is implemented in the third state thereof (the state where the state selecting member 11 is located at the third position P3) is the "specific mode transition" in the present invention.

(2) The first and second embodiments are described with respect to an example in which the input rotating element engagement portion 21 is located on the axial first direction L1 side with respect to the input member engagement portion 20, and the non-rotating member engagement portion 22 is located on the axial first direction L1 side with respect to the input rotating element engagement portion 21. However, embodiments of the present invention are not limited to them, and the relative positional relation in the axial direction L among the input member engagement portion 20, the input rotating element engagement portion 21, and the non-rotating member engagement portion 22 can be changed as appropriate. For example, the non-rotating member engagement portion 22, the input member engagement portion 20, and the input rotating element engagement portion 21 may be arranged in this order from the axial second direction L2 side along the axial direction L.

As in the second embodiment, in the configuration in which at least one of the input member engagement portion 20, the input rotating element engagement portion 21, and the non-rotating member engagement portion 22 is an externally-toothed engagement portion, and at least one of the remainder is an internally-toothed engagement portion, the two engagement portions may be placed so as to have an overlapping portion as viewed in the radial direction of the differential gear unit DG. For example, as shown in FIG. 14, the non-rotating member engagement member 22 configured as an internally-toothed engagement portion may be placed at such a position that the non-rotating member engagement portion 22 has a portion overlapping the input rotating element engagement portion 21 configured as an externally-toothed engagement portion, as viewed in the radial direction of the differential gear unit DG.

Figure 14:
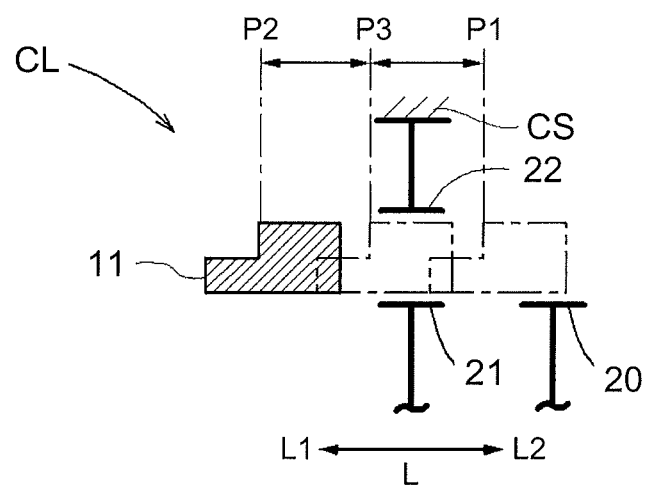
FIG. 14 is a diagram illustrating operation of an engagement device according to still another embodiment of the present invention.

In the example shown in FIG. 14, the state selecting member 11 is formed by a stepped cylindrical member whose outer peripheral surface has a small diameter on the axial first direction L 1 side and a large diameter on the axial second direction L2 side, and an engagement portion with the non-rotating member engagement portion 22 is formed in the large diameter portion of the outer peripheral surface. Thus, the state selecting member 11 can be configured not to mesh with the non-rotating member engagement portion 22 when located at the first position P1, and to mesh with the non-rotating member engagement portion 22 when located at the first position P3, whereby each of the first state, the second state, and the third state can be implemented as in the above embodiments. In the example shown in FIG. 14, unlike the first and second embodiments, the state selecting member 11 is configured not to mesh with any of the engagement portions 20, 21, 22 when located at the second position P2. The first position P1, the third position P3, and the second position P2 are located in this order from the axial second direction L2 side along the axial direction L, and the first position P1 and the second position P2 are the two positions located on both sides in the axial direction L. In this configuration, the first position P1 and the second position P2 correspond to the "two end positions" in the present invention.

Figure 15:
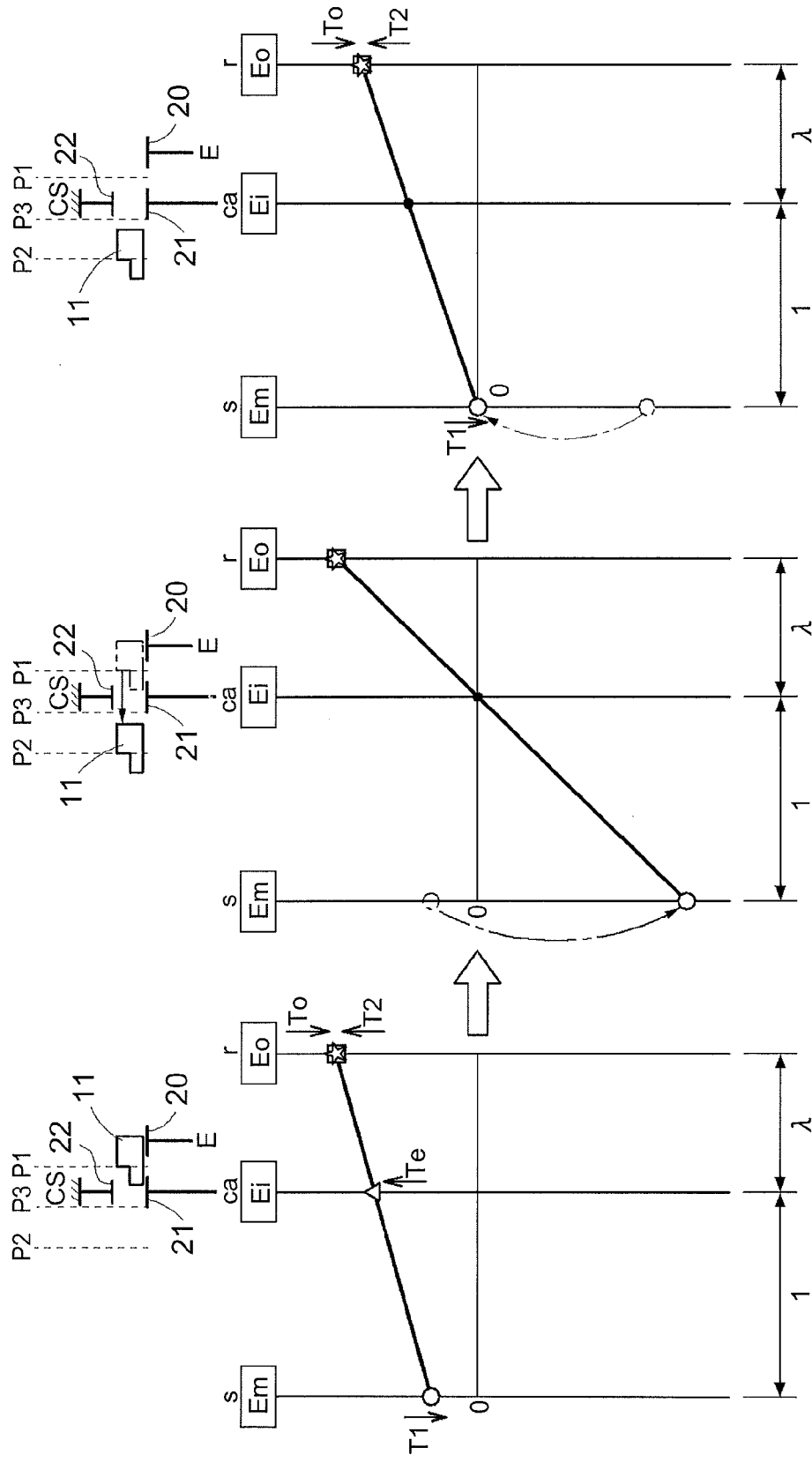
FIG. 15 shows speed diagrams showing how the operating state of a differential gear unit changes during transition from a first state to a second state according to the still another embodiment of the present invention.

FIG. 15 shows an example of switching the drive mode in this case. FIG. 15 shows how the operating state of the differential gear unit DG changes during mode transition from the hybrid drive mode that is implemented in the first state of the engagement device CL to the first electric drive mode that is implemented in the second state thereof. Although detailed description is omitted, in mode transition from the hybrid drive mode to the first electric drive mode, the state selecting member 11 is shifted from the first position P1 to the second position P2 with the rotational speeds of both the input rotating element Ei and the input member I being zero in the course of the transition. At this time, the state selecting member 11 is continuously shifted from the first position P1 to the second position P2 without stopping at the third position P3. In this configuration, mode transition between the hybrid drive mode that is implemented in the first state of the engagement device CL (the state where the state selecting member 11 is located at the first position P1) and the first electric drive mode that is implemented in the second state thereof (the state where the state selecting member 11 is located at the second position P2) is the "specific mode transition" in the present invention.

(3) The first and second embodiments and the embodiments (1) and (2) are described with respect to an example in which in specific mode transition between two drive modes that are implemented at the two end positions located on both sides in the axial direction L out of the first position P1, the second position P2, and the third position P3 located along the axial direction L, the state selecting member 11 is continuously shifted from one of the two end positions to the other with the rotational speeds of both the input rotating element Ei and the input member I being zero. However, embodiments of the present invention are not limited to them, and the state selecting member 11 may be temporarily stopped in the middle position between the two end positions in the course of the transition. In this configuration, the specific mode transition is made while temporarily going through the drive mode that is implemented at the middle position.

(4) The first and second embodiments are described with respect to an example in which the input rotating element Ei and the input member I are brought into the non-coupled state in the third state. However, embodiments of the present invention are not limited to them, and the state selecting member 11 may be configured to mesh with all of the input member engagement portion 20, the input rotating element engagement portion 21, and the non-rotating member engagement portion 22, and the input rotating element Ei and the input member I may be brought into the coupled state in addition to the input rotating element Ei and the non-rotating member 60, when the state selecting member 11 is located at the third position P3. Although details are omitted, this configuration is implemented by, e.g., increasing the length of the state selecting member 11 in the axial direction L, in the configuration of FIG. 12.

(5) The first and second embodiments are described with respect to an example in which the first position P1 is located on the axial second direction L2 side with respect to the third position P3. However, embodiments of the present invention are not limited to them, and the first position P1 may be located on the axial first direction L1 side (the opposite side from the internal combustion engine E in the axial direction L) with respect to the third position P3, depending on the positional relation in the axial direction L among the engagement portions 20, 21, 22 and the shape of the state selecting member 11.

(6) The first and second embodiments are described with respect to an example in which the state selecting member 11 is placed between the internal combustion engine E and the differential gear unit DG in the axial direction L. However, embodiments of the present invention are not limited to them, and the state selecting member 11 may not be placed between the internal combustion engine E and the differential gear unit DG in the axial direction L, but may be placed on the same direction side in the axial direction L with respect to both the internal combustion engine E and the differential gear unit DG, depending on the positions where the internal combustion engine E and the differential gear unit DG are placed. Such a configuration can be used in, e.g., the configuration in which the internal combustion engine E is placed on a separate axis from the differential gear unit DG.

Figure 16:
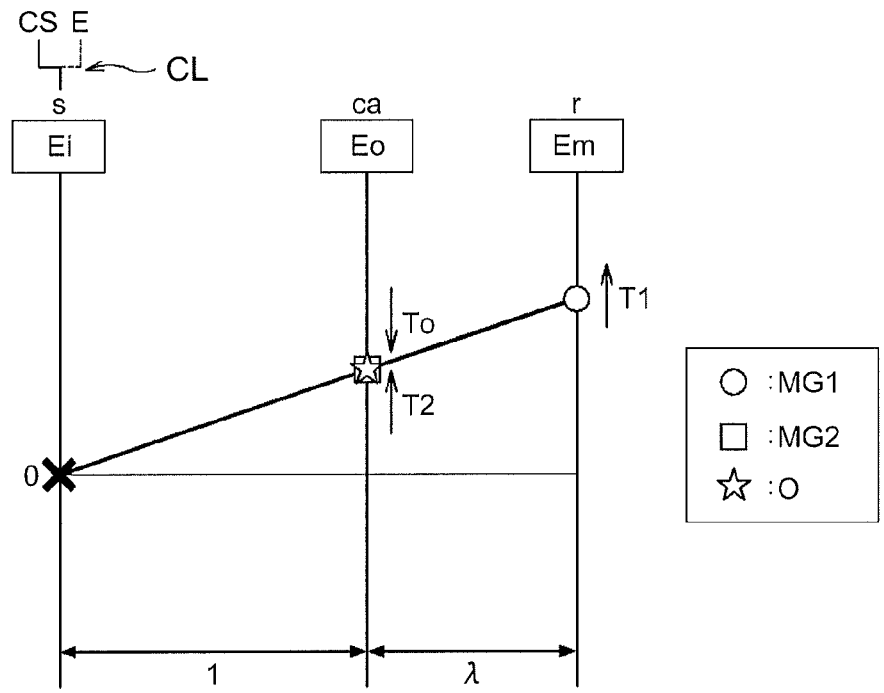
FIG. 16 is a speed diagram showing an example of the operating state of a differential gear unit in a third state according to yet another embodiment of the present invention.

(7) The first and second embodiments are described with respect to an example in which the order of the rotational speeds of the three rotating elements of the differential gear unit DG are the first rotating electrical machine coupling element Em, the input rotating element Ei, and the output rotating element Eo. However, embodiments of the present invention are not limited to them. For example, as shown in FIG. 16, the order of the rotational speeds may be the input rotating element Ei, the output rotating element Eo, and the first rotating electrical machine coupling element Em. In this configuration, unlike the above embodiments, the hybrid drive mode is basically a torque converter mode in which torque amplified with respect to the output torque of the internal combustion engine E is transferred to the output member O. FIG. 16 shows the operating state of the differential gear unit DG in the second electric drive mode.

(8) The first and second embodiments are described with respect to an example in which the second rotating electrical machine MG2 is drivingly coupled to the output rotating element Eo. However, embodiments of the present invention are not limited to them, and the second rotating electrical machine MG2 may be drivingly coupled to the rotating element other than the output rotating element Eo. For example, the second rotating electrical machine MG2 may be drivingly coupled to the input rotating element Ei without interposing the other rotating elements of the differential gear unit DG therebetween. In this case, although details are omitted, the first electric drive mode is the electric drive mode in which a reaction force of the torque of one of the first rotating electrical machine MG1 and the second rotating electrical machine MG2 is received by the other rotating electrical machine to move the vehicle. The second electric drive mode is the electric drive mode in which the vehicle is moved only by the output torque of the first rotating electrical machine MG1.

Figure 17:
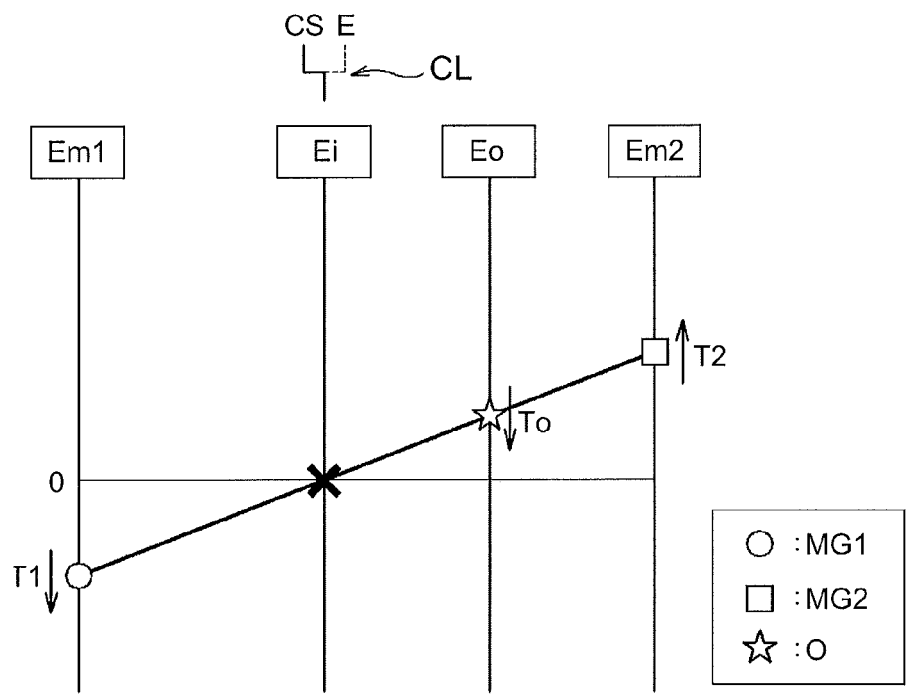
FIG. 17 is a speed diagram showing an example of the operating state of the differential gear unit in a third state according to a further another embodiment of the present invention.

(9) The first and second embodiments are described with respect to an example in which the differential gear unit DG has three rotating elements. However, embodiments of the present invention are not limited to them, and the differential gear unit DG may be configured to have four or more rotating elements. For example, the differential gear unit DG may be configured to have four rotating elements as shown in FIG. 17. Although details are omitted, the differential gear unit DG having four rotating elements can be configured by, e.g., using two planetary gear mechanisms and coupling two of three rotating elements of one of the planetary gear mechanisms to two of three rotating elements of the other planetary gear mechanism, respectively.

In the example shown in FIG. 17, the second rotating electrical machine MG2 is drivingly coupled to a second rotating electrical machine coupling element Em2 as a rotating element other than the input rotating element Ei, a first rotating electrical machine coupling element Em1 (the same as "Em" in the above embodiments), and the output rotating element Eo. In this configuration as well, the hybrid drive mode, the first electric drive mode, and the second electric drive mode can be implemented as in the above embodiments. Although details are omitted, in the example of FIG. 17, the first electric drive mode is the electric drive mode in which a reaction force of the torque of one of the first rotating electrical machine MG1 and the second rotating electrical machine MG2 is received by the other rotating electrical machine to move the vehicle, unlike the above embodiments.

In the example of FIG. 17, the order of the rotational speeds of the four rotating elements of the differential gear unit DG is the first rotating electrical machine coupling element Em1, the input rotating element Ei, the output rotating element Eo, and the second rotating electrical machine coupling element Em2. However, the order of the rotational speeds of the four rotating elements can be changed as appropriate. For example, a differential gear unit DG in which the order of the rotational speeds is (Em1, Em2, Ei, Eo), (Em1, Ei, Em2, Eo), (Ei, Em2, Eo, Em1), or (Ei, Eo, Em2, Em1) may be used as the differential gear unit DG having the order of the rotational speeds other than that shown in FIG. 17 (Em1, Ei, Eo, Em2).

(10) The first embodiment is described with respect to an example in which the damper DA and the flywheel 30 are provided between the input member I and the output shaft of the internal combustion engine E (internal combustion engine output shaft 70). However, the input member I may be directly drivingly coupled to the internal combustion engine E without interposing the damper DA and the flywheel 30 therebetween, so that the input member I and the internal combustion engine output shaft 70 rotate together.

(11) The first and second embodiments are described with respect to an example in which the differential gear unit DG is formed by the single-pinion type planetary gear mechanism PG. However, embodiments of the present invention are not limited to them, and the differential gear unit DG may be formed by a double-pinion type planetary gear mechanism or a Ravigneaux type planetary gear mechanism.

(12) Regarding other configurations as well, the embodiments disclosed in the specification are by way of example only in all respects, and embodiments of the present invention are not limited to them. That is, it is to be understood that configurations obtained by partially modifying as appropriate the configurations that are not described in the claims of the present application also fall in the technical scope of the present invention, as long as these configurations include the configurations described in the claims and the configurations equivalent thereto.

The present invention can be preferably applied to vehicle drive devices including an input member that is drivingly coupled to an internal combustion engine, an output member that is drivingly coupled to wheels, a first rotating electrical machine, a second rotating electrical machine, and a differential gear unit having at least three rotating elements.

What is claimed is:

1. A vehicle drive device, comprising: an input member that is drivingly coupled to an internal combustion engine; an output member that is drivingly coupled to a wheel; a first rotating electrical machine; a second rotating electrical machine; and a differential gear unit having at least three rotating elements, wherein the first rotating electrical machine, the input member, and the output member are drivingly coupled to the different rotating elements of the differential gear unit, respectively, without interposing the other rotating elements of the differential gear unit therebetween, the second rotating electrical machine is drivingly coupled to the rotating element of the differential gear unit other than the rotating element to which the first rotating electrical machine is drivingly coupled, without interposing the other rotating elements of the differential gear unit therebetween, a dog engagement device is provided on a power transmission path between the input member and an input rotating element as the rotating element of the differential gear unit to which the input member is drivingly coupled, the engagement device includes a state selecting member that switches a state among three states, which are a first state where the input rotating element and the input member are brought into a coupled state and the input rotating element and a non-rotating member are brought into a non-coupled state, a second state where the input rotating element is brought into the non-coupled state with both the input member and the non-rotating member, and a third state where the input rotating element and the non-rotating member are brought into the coupled state, a control portion controls operation of the state selecting member, the state selecting member is placed between the internal combustion engine and the differential gear unit in the axial direction of the differential gear unit so as to be movable along the axial direction, and is capable of selecting the first position implementing the first state, the second position implementing the second state, and the third position implementing the third state, and the control portion controls the state electing member so that, in specific mode transition between two drive modes that are implemented at two end positions located on both sides in the axial direction out of the first position, the second position, and the third position located along the axial direction, the state selecting member is continuously shifted from one of the two end positions to the other with rotational speeds of both the input rotating element and the input member being zero.

2. The vehicle drive device according to clam 1, wherein the state selecting member is placed between the internal combustion engine and the differential gear unit in an axial direction of the differential gear unit so as to be movable along the axial direction, and is capable of selecting a first position implementing the first state, a second position implementing the second state, and a third position implementing the third state, and the first position is located on an internal combustion engine side in the axial direction with respect to the third position.

3. The vehicle drive device according to claim 2, wherein
the engagement device further includes an input member engagement portion provided on the input member, an input rotating element engagement portion provided on the input rotating element, and a non-rotating member engagement portion provided on the non-rotating member,
the state selecting member is configured to selectively mesh with the input member engagement portion, the input rotating element engagement portion, and the non-rotating member engagement portion, the input member engagement portion is an externally-toothed engagement portion,
the input rotating element engagement portion is an externally-toothed engagement portion placed on an axial first direction side, which is an opposite side from the internal combustion engine in the axial direction of the differential gear unit, with respect to the input member engagement portion, and
the non-rotating member engagement portion is an externally-toothed engagement portion placed on the axial first direction side with respect to the input rotating element engagement portion, or the non-rotating member engagement portion is an internally-toothed engagement portion placed either at such a position that the non-rotating member engagement portion has a portion overlapping the input rotating element engagement portion as viewed in a radial direction of the differential gear unit, or on the axial first direction side with respect to the position.

4. The vehicle drive device according to claim 3, wherein
a flywheel is provided in a coupling portion of the input member with the input rotating element,
a damper is provided in a coupling portion of the input rotating element with the input member,
the input member engagement portion of the engagement member, which is provided on the input member, is formed on an outer peripheral surface of the flywheel,
the input rotating element engagement portion of the engagement member, which is provided on the input rotating element, is formed on an outer peripheral surface of the damper, and
the non-rotating member engagement portion of the engagement member, which is provided on the non-rotating member, is formed on an inner peripheral surface of a case accommodating at least the flywheel and the damper.

5. The vehicle drive device according to claim 2, wherein
the second position and the third position are located so as to adjoin each other along the axial direction.

6. The vehicle drive device according to claim 5, wherein
an order of rotational speeds of the at least three rotating elements of the differential gear unit is the rotating element to which the first rotating electrical machine is drivingly coupled, the input rotating element, and the rotating element to which the output member is drivingly coupled, and
the second rotating electrical machine is drivingly coupled to the rotating element of the differential gear unit other than the rotating element to which the first rotating electrical machine is drivingly coupled and the input rotating element, without interposing the other rotating elements of the differential gear unit therebetween.

7. The vehicle drive device according to claim 1, wherein
the engagement device further includes an input member engagement portion provided on the input member, an input rotating element engagement portion provided on the input rotating element, and a non-rotating member engagement portion provided on the non-rotating member,
the state selecting member is configured to selectively mesh with the input member engagement portion, the input rotating element engagement portion, and the non-rotating member engagement portion,
the input member engagement portion is an externally-toothed engagement portion,
the input rotating element engagement portion is an externally-toothed engagement portion placed on an axial first direction side, which is an opposite side from the internal combustion engine in the axial direction of the differential gear unit, with respect to the input member engagement portion, and
the non-rotating member engagement portion is an externally-toothed engagement portion placed on the axial first direction side with respect to the input rotating element engagement portion, or the non-rotating member engagement portion is an internally-toothed engagement portion placed either at such a position that the non-rotating member engagement portion has a portion overlapping the input rotating element engagement portion as viewed in a radial direction of the differential gear unit, or on the axial first direction side with respect to the position.

8. The vehicle drive device according to claim 2, wherein
a flywheel is provided in a coupling portion of the input member with the input rotating element,
a damper is provided in a coupling portion of the input rotating element with the input member,
the input member engagement portion of the engagement member, which is provided on the input member, is formed on an outer peripheral surface of the flywheel,
the input rotating element engagement portion of the engagement member, which is provided on the input rotating element, is formed on an outer peripheral surface of the damper, and
the non-rotating member engagement portion of the engagement member, which is provided on the non-rotating member, is formed on an inner peripheral surface of a case accommodating at least the flywheel and the damper.

9. The vehicle drive device according to claim 7, wherein
a flywheel is provided in a coupling portion of the input member with the input rotating element,
a damper is provided in a coupling portion of the input rotating element with the input member,
the input member engagement portion of the engagement member, which is provided on the input member, is formed on an outer peripheral surface of the flywheel,
the input rotating element engagement portion of the engagement member, which is provided on the input rotating element, is formed on an outer peripheral surface of the damper, and
the non-rotating member engagement portion of the engagement member, which is provided on the non-rotating member, is formed on an inner peripheral surface of a case accommodating at least the flywheel and the damper.

10. The vehicle drive device according to claim 1, wherein
an order of rotational speeds of the at least three rotating elements of the differential gear unit is the rotating element to which the first rotating electrical machine is drivingly coupled, the input rotating element, and the rotating element to which the output member is drivingly coupled, and the second rotating electrical machine is drivingly coupled to the rotating element of the differential gear unit other than the rotating element to which the first rotating electrical machine is drivingly coupled and the input rotating element, without interposing the other rotating elements of the differential gear unit therebetween.

11. The vehicle drive device according to claim 2, wherein an order of rotational speeds of the at least three rotating elements of the differential gear unit is the rotating element to which the first rotating electrical machine is drivingly coupled, the input rotating element, and the rotating element to which the output member is drivingly coupled, and the second rotating electrical machine is drivingly coupled to the rotating element of the differential gear unit other than the rotating element to which the first rotating electrical machine is drivingly coupled and the input rotating element, without interposing the other rotating elements of the differential gear unit therebetween.

12. The vehicle drive device according to claim 7, wherein an order of rotational speeds of the at least three rotating elements of the differential gear unit is the rotating element to which the first rotating electrical machine is drivingly coupled, the input rotating element, and the rotating element to which the output member is drivingly coupled, and the second rotating electrical machine is drivingly coupled to the rotating element of the differential gear unit other than the rotating element to which the first rotating electrical machine is drivingly coupled and the input rotating element, without interposing the other rotating elements of the differential gear unit therebetween.

13. The vehicle drive device according to claim 3, wherein an order of rotational speeds of the at least three rotating elements of the differential gear unit is the rotating element to which the first rotating electrical machine is drivingly coupled, the input rotating element, and the rotating element to which the output member is drivingly coupled, and the second rotating electrical machine is drivingly coupled to the rotating element of the differential gear unit other than the rotating element to which the first rotating electrical machine is drivingly coupled and the input rotating element, without interposing the other rotating elements of the differential gear unit therebetween.

14. The vehicle drive device according to claim 8, wherein an order of rotational speeds of the at least three rotating elements of the differential gear unit is the rotating element to which the first rotating electrical machine is drivingly coupled, the input rotating element, and the rotating element to which the output member is drivingly coupled, and the second rotating electrical machine is drivingly coupled to the rotating element of the differential gear unit other than the rotating element to which the first rotating electrical machine is drivingly coupled and the input rotating element, without interposing the other rotating elements of the differential gear unit therebetween.

* * * * *